United States Patent Office 3,347,789
Patented Oct. 17, 1967

3,347,789
TREATMENT OF OIL WELLS
Woodrow J. Dickson, La Habra, and Fred W. Jenkins, Buena Park, Calif., assignors to Petrolite Corporation
No Drawing. Application May 24, 1965, Ser. No. 458,373, which is a continuation of application Ser. No. 115,884, June 9, 1961, and is also a division of application Ser. No. 47,387, Aug. 4, 1960. Divided and this application Mar. 4, 1966, Ser. No. 531,794
5 Claims. (Cl. 252—8.55)

This application is a division of application Ser. No. 47,387, filed on Aug. 4, 1960, now abandoned, and is copending with application Ser. No. 458,373, filed on May 24, 1965, now abandoned as a division of said application Ser. No. 458,373, and is also a continuation of application Ser. No. 115,884, filed on June 9, 1961, now abandoned, and is copending with each of the following applications:

| Ser. No. | Filing Date | Title |
|---|---|---|
| 1. 505,037 | Oct. 24, 1965 | Fuel Composition |
| 2. 115,876 | June 9, 1961 | Process of Preventing Scale, granted as U.S. Pat. No. 3,251,778 on May 17, 1966 |
| 3. 505,039 | Oct. 24, 1965 | Preventing Corrosion, granted as U.S. Pat. No. 3,262,791 on July 26, 1966 |
| 4. 115,877 | June 9, 1961 | Process of Breaking Emulsions, now abandoned |
| 5. 115,878 | June 9, 1961 | Lubricating Composition, now Patent No. 3,301,783 |
| 6. 115,881 | June 9, 1961 | Inhibiting Foam, now abandoned |
| 7. 115,882 | June 9, 1961 | Flotation Process, now abandoned |
| 8. 115,883 | June 9, 1961 | Drilling Fluids, now abandoned |
| 9. 308,063 | Sept. 11, 1963 | Anti-Stripping Agents, granted as U.S. Pat. No. 3,259,513 on July 5, 1966 |

This invention relates to polyalkyleneimines and to derivatives thereof. More particularly, this invention relates to polyethyleneimine and to polyethyleneimine derivatives containing various groups, such as the oxyalkylated, acylated, alkylated, carbonylated, olefinated, etc., derivatives thereof, prepared by introducing such groups individually, alternately, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as antioxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as deicing and anti-stalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24-D (toxaphene), chlordane, nicotine sulfate, hexachlorocyclohexane, and the like; as agents useful in building materials, for example, in the water repellent treatment of plaster, concrete, cement, roofing materials, floor sealers; as additives in bonding agents for various insulating building materials; and the like.

Polyalkyleneimine employed in this invention include high molecular weight polyethyleneimine, i.e. polymers of ethyleneimine,

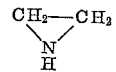

or substituted products thereof:

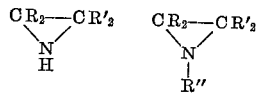

etc., wherein R, R' and R" are hydrogen or a substituted group, for example a hydrocarbon group such as alkyl, cycloalkyl, aryl, aralkyl, alkaryl, etc., but preferably hydrogen or alkyl.

Thus, polyethyleneimine is polymerized, substituted or an unsubstituted, 1,2-alkyleneimine. Although polyethyleneimine is the preferred embodiment, other illustrative examples include, for example,

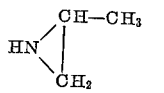
1,2-propyleneimine

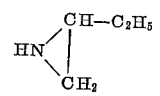
1,2-butyleneimine

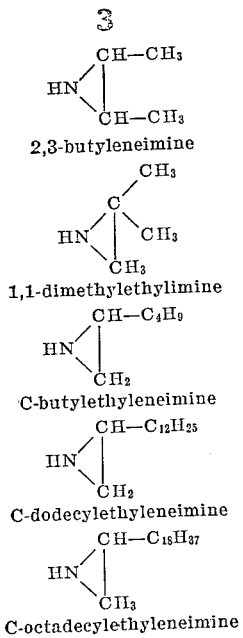

2,3-butyleneimine 1,1-dimethylethylimine

C-butylethyleneimine

C-dodecylethyleneimine

C-octadecylethyleneimine

A preferred class of polymerized 1,2-alkyleneimines include those derived from polymerizing

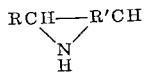

wherein R and R' are hydrogen or an alkyl radical, the latter being the same or different. Of the substituted ethyleneimines, propyleneimines are preferred.

The polyethyleneimines useful herein have molecular weights of, for example, at least 800, for example from 800 to 100,000 or higher, but preferably 20,000 to 75,000 or higher. There is no upper limit to the molecular weight of the polymer employed herein and molecular weights of 200,000, 500,000 or 1,000,000 or more can be employed.

The optimum molecular weight will depend on the particular derivative, the particular use, etc.

Although these products are generally prepared by polymerizing 1,2-alkyleneimines, they may also be prepared by other known methods, for example, by decarboxylating 2-oxazolidine as described in 2,806,839, etc.

Commercial examples of these compounds are available, for example, those sold by the Chemirad Corporation as "PEI" in a 50% by weight aqueous solution having a molecular weight of 30–40,000. Propyleneimine is also commercially available and suitable polymers can be prepared from this material.

For convenience and simplicity, this invention will be illustrated by employing polyethyleneimine.

Polyethyleneimine is a well known polymer whose preparation from ethyleneimine is described in U.S. Patent 2,182,306 and elsewhere. For convenience in polymerizing and handling, the polymer is generally prepared as an aqueous solution. Water can be removed, if desired, by distilling the water therefrom or by azeotroping the water therefrom in the presence of a hydrocarbon, such as xylene, and using the solution and/or suspension obtained thereby for further reaction or use. The following polyethyleneimines of the molecular weights indicated are employed herein to illustrate this invention.

| Polymer designation: | Approx. mol. wt. range |
|---|---|
| Polyethyleneimine 900 | 800–1000 |
| Polyethyleneimine 5,000 | 4000–6000 |
| Polyethyleneimine 11,500 | 10,000–12,500 |
| Polyethyleneimine 20,000 | 18,000–22,000 |
| Polyethyleneimine 35,000 | 30,000–40,000 |
| Polyethyleneimine 50,000 | 40,000–60,000 |
| Polyethyleneimine 75,000 | 65,000–85,000 |
| Polyethyleneimine 100,000 | 80,000–125,000 |

ACYLATION

A wide variety of acylating agents can be employed. Acylation is carried out under dehydrating conditions, i.e., water is removed. Any of the well-known methods of acylation can be employed. For example, heat alone, heat and reduced pressure, heat in combination with an azeotroping agent, etc., are all satisfactory.

The temperature at which reaction between the acylating agent and polyethyleneimine is effected is not too critical a factor. Since the reaction involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and polyethyleneimine. In order to facilitate the removal of this water, to effect a more complete reaction in accordance with the principle of LeChatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series. Non-limiting examples of the preferred solvent are benzene, toluene, and xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and polyethyleneimine is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than six carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxy-myristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, choroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acid, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

Anhydride

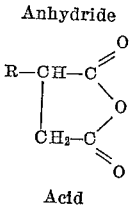

Acid

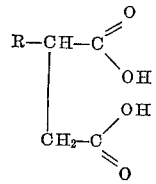

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are:

ethenyl succinic acid anhydrides;
ethenyl succinic acid;
ethyl succinic acid anhydride;
propenyl succinic acid anhydride;
sulfurized propenyl succinic acid anhydride;
butenyl succinic acid;
2-methylbutenyl succinic acid anhydride;
1,2-dichloropentyl succinic acid anhydride;
hexenyl succinic acid anhydride;
hexyl succinic acid;
sulfurized 3-methylpentenyl succinic acid anhydride;
2,3-dimethylbutenyl succinic acid anhydride;
3,3-dimethylbutenyl succinic acid;
1,2-dibromo-2-ethylbutyl succinic acid;
heptenyl succinic acid anhydride;
1,2-diiodooctyl succinic acid;
octenyl succinic acid anhydride;
2-methyl-heptenyl succinic acid anhydride;
4-ethylhexenyl succinic acid;
2-isopropylpentenyl succinic acid anhydride;
noneyl succinic acid anhydride;
2-propylhexenyl succinic acid anhydride;
decenyl succinic acid;
decenyl succinic acid anhydride;
5-methyl-2-isopropylhexenyl succinic acid anhydride;
1,2-dibromo-2-ethyloctenyl succinic acid anhydride;
decyl succinic acid anhydride;
undecenyl succinic acid anhydride;
1,2-dichloro-undecyl succinic acid anhydride;
1,2-dichloro-undecyl succinic acid;
3-ethyl-2-t-butylpentenyl succinic acid anhydride;
dodecenyl succinic acid anhydride;
dodecenyl succinic acid;
2-propylnonenyl succinic acid anhydride;
3-butyloctenyl succinic acid;
tridecenyl succinic acid anhydride;
tetradecenyl succinic acid anhydride;
hexadecenyl succinic acid anhydride;
sulfurized octadecenyl succinic acid;
octadecyl succinic acid anhydride;
1,2-dibrom-2-methylpentadecenyl succinic acid anhydride;
8-propylpentadecyl succinic acid anhydride;
eicosenyl succinic acid anhydride;
1,2-dichloro-2-methylnonadecenyl succinic acid anhydride;
2-octyldodecenyl succinic acid;
1,2-diiodotetracosenyl succinic acid anhydride;
hexacosenyl succinic acid;
hexacosenyl succinic acid anhydride; and
hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cyclic amidine ring, the formation of acid imides such as might occur when anhydrides such as the alkenylsuccinic acids are reacted, i.e.

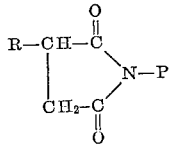

wherein P=the polyethyleneimine residue, polymers as might occur when a dicarboxylic acid is reacted intermolecularly with polyethyleneimine, cyclization as might occur when a dicarboxylic acid reacts intramolecularly with polyethyleneimine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with polyethyleneimine will depend on the number of acylation reactive positions contained therein as well as the number of moles of acylating agent one wishes to incorporate into the polymer. Theoretically one mole of acylating agent can be reacted per amino group on the polyethyleneimine molecule. We have advantageously reacted 1–20 moles of acylating agent per mole of polyethylene 900, but preferably 1–12 moles. Proportionately greater amounts of acylating agent can be employed with polyethyleneimine of higher molecular weight. Thus, with polyethyleneimine 20,000, 1–50 moles of acylating agent can be employed, and with polyethyleneimine 35,000, 1–100 moles can be employed, etc. Optimum acylation will depend on the particular use.

The following examples are illustrative of the preparation of the acylated polyethyleneimine.

The following general procedure is employed in acylating. A xylene suspension of polyethyleneimine, after the removal of water, is mixed with the desired ratio of acid. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired, the maximum temperature is generally 180–250° C. and more than one mole of water per carboxylic group is removed. The reaction times range from 4 to 24 hours. Here again, the true test of the degree of reaction is the amount of water removed.

*Example 1—A₇*

The reaction is carried out in a 5 liter, 3 necked flask furnished with a stirring device, thermometer, phase separating trap, condenser and heating mantle to 1 mole (900 grams) of polyethyleneimine 900 in an equal weight of xylene (i.e., 900 grams), 200 grams of lauric acid (1 mole) is added with stirring in about ten minutes. The reaction mixture is then heated gradually to about 145° C. in half an hour and then held at about 160° C. over a period of 3 hours until 19 grams (1.1 moles) of water is collected in the side of the tube. The solvent is then removed with gentle heating under reduced pressure of approximately 20 mm. The product is a dark, viscous, xylene-soluble liquid.

*Example 1—A₆*

The prior example is repeated except that the final reaction temperature is maintained at 240° C. and 36 grams (2 moles) of water are removed instead of 19 grams (1.1 moles). Infrared analysis of the product indicates the presence of a cyclic amidine ring.

The following examples of acylated polyethyleneimines are prepared in the manner of the above examples from the polyethyleneimine noted in the following table. The products obtained are dark, viscous materials.

In the examples the symbol "A" identifies the acylated polyethyleneimine. Thus, specifically "1-A," represents acylated polyethyleneimine.

TABLE I.—ACYLATED PRODUCTS OF POLYETHYLENEIMINE

| Ex. | Acid | Molecular weight of polyethyleneimine (PE) | Ratio mols of acid per mol of PE | Ratio mols of water removed per mol of acid |
|---|---|---|---|---|
| 1-A₁ | Lauric (200) | 900 | 10:1 | 1.12 |
| 1-A₂ | do | 900 | 8:1 | 1.3 |
| 1-A₃ | do | 900 | 6:1 | 1.5 |
| 1-A₄ | do | 900 | 5:1 | 1.1 |
| 1-A₅ | do | 900 | 4:1 | 1.85 |
| 1-A₆ | do | 900 | 1:1 | 2.0 |
| 1-A₇ | do | 900 | 1:1 | 1.1 |
| 2-A₁ | Oleic (282) | 5,000 | 6:1 | 1.3 |
| 2-A₂ | do | 5,000 | 5:1 | 1.02 |
| 2-A₃ | do | 5,000 | 4:1 | 1.6 |
| 2-A₄ | do | 5,000 | 1:1 | 2.0 |
| 3-A₁ | Acetic (60) | 11,500 | 10:1 | 1.3 |
| 3-A₂ | do | 11,500 | 5:1 | 1.8 |
| 3-A₃ | do | 11,500 | 2:1 | 1.1 |
| 3-A₄ | do | 11,500 | 1:1 | 1.2 |
| 4-A₁ | Palmitic (256.4) | 11,500 | 3:1 | 1.6 |
| 4-A₂ | do | 11,500 | 2:1 | 1.3 |
| 4-A₃ | do | 11,500 | 1:1 | 2.0 |
| 5-A₁ | Stearic (284) | 20,000 | 3:1 | 1.4 |
| 5-A₂ | do | 20,000 | 2:1 | 1.1 |
| 6-A₁ | Dimeric (600) (Emery Industries) | 20,000 | 3:1 | 1.5 |
| 6-A₂ | do | 20,000 | 2:1 | 2.0 |
| 6-A₃ | do | 20,000 | 1:1 | 1.1 |
| 6-A₄ | do | 20,000 | 1:2 | 2.0 |
| 7-A₁ | Nonanoic (158) | 50,000 | 3:1 | 1.7 |
| 7-A₂ | do | 50,000 | 2:1 | 1.6 |
| 7-A₃ | do | 50,000 | 1:1 | 1.5 |
| 8-A₁ | Myristic (228.4) | 50,000 | 3:1 | 1.1 |
| 8-A₂ | do | 50,000 | 2:1 | 1.9 |
| 8-A₃ | do | 50,000 | 1:1 | 1.3 |
| 9-A₁ | Alkenyl (C₁₂) Succinic Anhy. (266) | 50,000 | 6:1 | 1.5 |
| 9-A₂ | do | 50,000 | 4:1 | 1.6 |
| 9-A₃ | do | 50,000 | 2:1 | 1.4 |
| 10-A₁ | Naphthenic (330) (Sunaptic Acid B) | 50,000 | 2:1 | 1.8 |
| 10-A₂ | do | 50,000 | 1:1 | 1.2 |
| 11-A₁ | Maleic Anhydride (98) | 50,000 | 1:1 | |
| 11-A₂ | do | 50,000 | 0.8:1 | |
| 11-A₃ | do | 50,000 | 1:2 | |
| 12-A₁ | Oleic (282) | 100,000 | 2:1 | 1.6 |
| 12-A₂ | do | 100,000 | 1:1 | 1.4 |
| 13-A₁ | Diglycolic (134) | 100,000 | 1:1 | 1.0 |
| 13-A₂ | do | 100,000 | 1:2 | 2.0 |
| 14-A₁ | Diphenolic (286) | 100,000 | 2:1 | 1.1 |
| 14-A₂ | do | 100,000 | 1:1 | 1.1 |

The following table presents specific illustration of compounds other than polyethyleneimine and its derivatives.

TABLE I-A.—ACYLATED PRODUCTS OF POLYPROPYLENEIMINE

| Example | Molecular Weight of Polypropyleneimine | Acid | Mols of Acid per Mol of Polypropyleneimine | Mols of Water Removed per Mol of Acid |
|---|---|---|---|---|
| 15-A₁ | 500 | Stearic (284) | 2:1 | 1.9 |
| 15-A₂ | 500 | do | 1:1 | 1.1 |
| 15-A₃ | 500 | Lauric (200) | 1:1 | 0.9 |
| 16-A₁ | 1,000 | Oleic (282) | 3:1 | 1.0 |
| 16-A₂ | 1,000 | Palmitic (256.4) | 1:1 | 1.2 |
| 16-A₃ | 1,000 | Acetic (60) | 2:1 | 1.0 |
| 17-A₁ | 5,000 | Stearic (284) | 1:1 | 2.0 |
| 17-A₂ | 5,000 | do | 3:1 | 1.3 |
| 17-A₃ | 5,000 | Dimeric (600) (Emery Industries) | 1:1 | 1.5 |
| 18-A₁ | 10,000 | Diglycolic (134) | 4:1 | 0.9 |
| 18-A₂ | 10,000 | Diphenolic (286) | 2:1 | 1.0 |
| 18-A₃ | 10,000 | Naphthenic (330) | 1:1 | 1.0 |
| 19-A₁ | 20,000 | Maleic Anhydride (98) | 1:1 | |
| 19-A₂ | 20,000 | Nonanoic (158) | 4:1 | 3.2 |
| 19-A₃ | 20,000 | Oleic (282) | 2:1 | 2.1 |
| 20-A₁ | 40,000 | Myristic (228.4) | 2:1 | 1.7 |
| 20-A₂ | 40,000 | Oleic (282) | 3:1 | 2.8 |
| 20-A₃ | 40,000 | Alkenyl (C₁₂) Succinic Anhydride (266) | 1:1 | |

OXYALKYLATION

Polyethyleneimine can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions of propylene oxide and ethylene oxide, or smaller proportions thereof in relation to polyethyleneimine. Thus, the molar ratio of alkylene oxide to polyethyleneimine can range within wide limits, for example, from a 1:1 mole ratio to a ratio of 1000:1, or higher, but preferably 1 to 200. For example, in demulsification extremely high alkylene oxide ratios are often advantageously employed such as 200–300 or more moles of alkylene oxide per mole of polyethyleneimine. On the other hand, for certain applications such as corrosion prevention and use as fuel oil additives, lower ratios of alkylene oxides are advantageously employed, i.e., 1–10/25 moles of alkylene oxide per mole of polyethyleneimine. With higher molecular weight polyethyleneimine, more oxyalkylatable reaction centers are present for alkylene oxide addition and very high ratios of alkylene oxide can be added. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts 1 and 2 of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The symbol employed to designate oxyalkylation is "O." Specifically "1-O" represents oxyalkylated polyethyleneimine.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. Polyethyleneimine dissolved and/or suspended in an equal weight of xylene is charged into the reactor. The autoclave is sealed, swept with nitrogen, stirring started immediately and heat applied. The temperature is allowed to rise to approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

Example 1–O₁

Using the oxyalkylation apparatus and procedure stated above, the following compounds are prepared: 900 grams (1 mol) of polyethyleneimine 900 in xylene are charged into a stainless steel autoclave, swept with nitrogen, stirring started, and autoclave sealed. The temperature is allowed to rise approximately 100° C. and ethylene oxide is injected continuously until 220 grams (5 mols) total had been added over a one-half hour period. This reaction is exothermic and requires cooling to avoid a rise in temperature after removal of xylene. The reaction mass is transferred to a suitable container. Upon cooling to room temperature, the reaction mass is a dark extremely viscous liquid.

Example 1–O₂

The same procedure as Example 1–O₁ is used except that 396 grams of ethylene oxide (9 mols) is added to 900 grams (1 mol) of polyethyleneimine 900. This reaction material is a dark viscous liquid at room temperature.

Example 1–O₃

The same procedure as Example 1–O₁ is used and 396 grams of ethylene oxide (9 mols) are added to 900 grams (1 mol) of polyethyleneimine 900. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of polyethyleneimine 900 and a total of 22 mols of reacted ethylene oxide.

Example 1–O₄

A portion of the reaction mass of Example 1–O₃ is transferred to another autoclave and an additional amount of EtO was added. The reaction mass now contains the ratio of 1 mol of polyethyleneimine 900 to 40 mols of EtO.

Example 1–O₅

The addition of ethylene oxide to Example 1–O₄ is continued until a molar ratio of 1 mol of polyethyleneimine 900 to 75 mols of EtO is reached.

Example 1–O₆

The addition of ethylene oxide to Example 1–O₅ is continued until a molar ratio of 1 mol of polyethyleneimine 900 to 83 mols of EtO is reached.

Example 1–O₇

The addition of ethylene oxide to the Example 1–O₆ is continued until a molar ratio of 1 mol of polyethyleneimine 900 to 105 mols of EtO is reached.

Example 16–O₁

2,000 grams (0.1 mol) of polyethyleneimine of molecular weight of 20,000 in xylene are charged into a conventional stainless steel autoclave. The temperature is raised to 120° C., the autoclave is flushed with nitrogen and sealed. Then 11.6 grams of propylene oxide (0.2 mol) are added slowly at 120° C. A sample is taken at this point and labeled 16–O₁. This sample contains two mols of PrO for each mol of polyethyleneimine. It is a dark, pasty solid at room temperature.

Example 16–O₂

The addition of propylene oxide to 16–O₁ is continued as follows: The autoclave is opened and 5 grams of sodium methylate are added. The autoclave is again purged with nitrogen and sealed. Propylene oxide is added carefully until an additional 23.2 grams have been reacted. A sample is taken at this point and labeled 16–O₂. This compound now contains 6 mols of propylene oxide for each mol of polyethyleneimine 20,000.

Example 16–O₃

The oxypropylation of 16–O₂ is continued until an additional 52.2 grams of propylene oxide are reacted. A sample is taken at this point and labeled 16–O₃. 16–O₃ contains 15 mols of propylene oxide for each mol of polyethyleneimine 20,000. At room temperature the product is a dark, pasty solid.

This oxyalkylation is continued to produce Examples 16–O₄, 16–O₅.

A summary of oxyalkylated products produced from polyethyleneimines is presented in the following Table II.

The Roman numerals (I), (II), and (III) beside the mols of oxide added indicate the order of oxide addition (I) first, (II) second and (III) third, etc.

The following abbreviations are also used throughout this application:

EtO—Ethylene oxide
PrO—Propylene oxide
BuO—Butylene oxide

TABLE II.—OXYALKYLATED PRODUCTS

[Mols of alkylene oxide/mol polyethyleneimine]

| Ex. | Mol. wt. of PE | EtO | PrO | BuO | Physical properties |
|---|---|---|---|---|---|
| 1-O₁ | 900 | 5 | | | Viscous liquid. |
| 1-O₂ | 900 | 9 | | | So id. |
| 1-O₃ | 900 | 22 | | | Do. |
| 1-O₄ | 900 | 40 | | | Do. |
| 1-O₅ | 900 | 75 | | | Do. |
| 1-O₆ | 900 | 83 | | | Do. |
| 1-O₇ | 900 | 105 | | | Do. |
| 1-O₈ | 900 | 200 | | | Do. |
| 2-O₁ | 900 | | 5 | | Viscous liquid. |
| 2-O₂ | 900 | | 11 | | Do. |
| 2-O₃ | 900 | | 20 | | Dark, thick liquid. |
| 2-O₄ | 900 | | 50 | | Do. |
| 2-O₅ | 900 | | 80 | | Do. |
| 2-O₆ | 900 | | 115 | | Do. |
| 2-O₇ | 900 | | 190 | | Do. |
| 2-O₈ | 900 | | 230 | | Do. |
| 3-O₁ | 900 | | | 4 | Do. |
| 3-O₂ | 900 | | | 15 | Do. |
| 3-O₃ | 900 | | | 35 | Do. |
| 3-O₄ | 900 | | | 60 | Do. |
| 4-O₁ | 900 | 10 (I) | 10 (II) | | Viscous liquid. |
| 4-O₂ | 900 | 10 (I) | 10 (I) | | Do. |
| 4-O₃ | 900 | 30 (II) | 10 (I) | | So!id. |
| 4-O₄ | 900 | 50 (II) | 60 (I) | | Do. |
| 5-O₁ | 900 | Glycidol, 4 mols | | | Viscous liquid. |
| 6-O₁ | 900 | 10 (II) | 10 (I) | 12 (III) | Dark, thick liquid. |
| 6-O₂ | 900 | 5 (III) | 50 (II) | 5 (I) | Do. |
| 6-O₃ | 900 | 18 (I) | 12 (III) | 10 (II) | Do. |
| 6-O₄ | 900 | 20 (I) | 90 (II) | 5 (III) | Do. |
| 7-O | 900 | Octylene oxide, 8 mols | | | Viscous liquid. |
| 8-O | 900 | Styrene oxide, 5 mols | | | Do. |
| 9-O | 900 | Epoxide 201 (Carbide and Carbon), 1 mol | | | So!id. |
| 10-O₁ | 5,000 | 1 | | | Viscous liquid. |
| 10-O₂ | 5,000 | 7 | | | Do. |
| 10-O₃ | 5,000 | 15 | | | So!id. |
| 10-O₄ | 5,000 | 30 | | | Do. |
| 10-O₅ | 5,000 | 60 | | | Do. |
| 10-O₆ | 5,000 | 120 | | | Do. |
| 11-O₁ | 5,000 | | 3 | | Viscous liquid. |
| 11-O₂ | 5,000 | | 20 | | Dark, thick liquid. |
| 11-O₃ | 5,000 | | 40 | | Do. |
| 11-O₄ | 5,000 | | 80 | | Do. |
| 11-O₅ | 5,000 | | 160 | | Do. |
| 12-O₁ | 5,000 | | | 5 | Do. |
| 12-O₂ | 5,000 | | | 10 | Do. |
| 12-O₃ | 5,000 | | | 15 | Do. |
| 12-O₄ | 5,000 | | | 20 | Do. |
| 13-O₁ | 5,000 | 20 (I) | 20 (II) | | Viscous liquid. |
| 13-O₂ | 5,000 | 15 (I) | 80 (II) | | Solid. |
| 13-O₃ | 5,000 | 5 (II) | 45 (I) | | Do. |
| 13-O₄ | 5,000 | 10 (II) | 10 (I) | | Do. |
| 14-O₁ | 5,000 | 5 (III) | 5 (II) | 5 (I) | Viscous liquid. |
| 14-O₂ | 5,000 | 15 (II) | 10 (III) | 5 (I) | Do. |
| 14-O₃ | 5,000 | 5 (I) | 40 (II) | 15 (III) | Do. |
| 14-O₄ | 5,000 | 35 (I) | 10 (III) | 10 (II) | Solid. |
| 14-O₅ | 5,000 | 10 (II) | 15 (I) | 20 (III) | Viscous liquid. |
| 14-O₆ | 5,000 | 6 (III) | 3 (I) | 2 (II) | Do. |
| 15-O₁ | 20,000 | 10 | | | So!id. |
| 15-O₂ | 20,000 | 35 | | | Do. |
| 15-O₃ | 20,000 | 60 | | | Do. |
| 15-O₄ | 20,000 | 85 | | | Do. |
| 15-O₅ | 20,000 | 105 | | | Do. |
| 15-O₆ | 20,000 | 140 | | | Do. |

TABLE II.—Continued

| Ex. | Mol. wt. of PE | EtO | PrO | BuO | Physical properties |
|---|---|---|---|---|---|
| 16-O₁ | 20,000 | | 2 | | Dark, pasty solid. |
| 16-O₂ | 20,000 | | 6 | | Do. |
| 16-O₃ | 20,000 | | 15 | | Do. |
| 16-O₄ | 20,000 | | 35 | | Do. |
| 16-O₅ | 20,000 | | 60 | | Do. |
| 17-O₁ | 20,000 | 4 (I) | 4 (II) | | Pasty solid. |
| 17-O₂ | 20,000 | 15 (I) | 30 (II) | | Do. |
| 17-O₃ | 20,000 | 30 (II) | 30 (I) | | Do. |
| 17-O₄ | 20,000 | 7 (II) | 18 (I) | | Do. |
| 18-O₁ | 20,000 | | 5 (I) | 15 (II) | Solid. |
| 18-O₂ | 20,000 | 5 (I) | 40 (III) | 6 (II) | Light brown solid. |
| 18-O₃ | 20,000 | 15 (II) | 10 (I) | 30 (III) | Do. |
| 18-O₄ | 20,000 | 3 (II) | 8 (III) | 16 (I) | Do. |
| 18-O₅ | 20,000 | 20 (III) | 80 (I) | 3 (II) | Do. |
| 18-O₆ | 20,000 | 6 (III) | 18 (II) | 6 (I) | Do. |
| 19-O₁ | 50,000 | 2 | | | Do. |
| 19-O₂ | 50,000 | 6 | | | Do. |
| 19-O₃ | 50,000 | 15 | | | Solid. |
| 19-O₄ | 50,000 | 30 | | | Do. |
| 19-O₅ | 50,000 | 50 | | | Do. |
| 19-O₆ | 50,000 | 100 | | | Do. |
| 19-O₇ | 50,000 | 200 | | | Do. |
| 19-O₈ | 50,000 | 400 | | | Hard solid. |
| 20-O₁ | 50,000 | | 5 | | Pasty solid. |
| 20-O₂ | 50,000 | | 20 | | Do. |
| 20-O₃ | 50,000 | | 40 | | Do. |
| 20-O₄ | 50,000 | | 80 | | Do. |
| 20-O₅ | 50,000 | | 160 | | Do. |
| 20-O₆ | 50,000 | | 320 | | Do. |
| 21-O | 50,000 | Ep chlorohydrin, 3 mols | | | Do. |
| 22-O₁ | 50,000 | 18 (I) | 4 (II) | 4 (III) | Waxy solid. |
| 22-O₂ | 50,000 | 6 (II) | 12 (I) | 12 (III) | Do. |
| 22-O₃ | 50,000 | 14 (III) | 22 (II) | 10 (I) | Do. |
| 22-O₄ | 50,000 | 5 (I) | 48 (III) | 6 (II) | Do. |
| 22-O₅ | 50,000 | 1 (II) | 10 (I) | 3 (III) | Do. |
| 22-O₆ | 50,000 | 10 (III) | 80 (I) | 10 (II) | Do. |
| 23-O₁ | 100,000 | 1 | | | Do. |
| 23-O₂ | 100,000 | 5 | | | Do. |
| 23-O₃ | 100,000 | 14 | | | Do. |
| 23-O₄ | 100,000 | 24 | | | Do. |
| 23-O₅ | 100,000 | 48 | | | Do. |
| 23-O₆ | 100,000 | 60 | | | Do. |
| 23-O₇ | 100,000 | 75 | | | Do. |
| 23-O₈ | 100,000 | 150 | | | Do. |
| 24-O₁ | 100,000 | | 1 | | Do. |
| 24-O₂ | 100,000 | | 3 | | Do. |
| 24-O₃ | 100,000 | | 5 | | Do. |
| 24-O₄ | 100,000 | | 10 | | Do. |
| 24-O₅ | 100,000 | | 20 | | Do. |
| 24-O₆ | 100,000 | | 40 | | Do. |
| 24-O₇ | 100,000 | | 80 | | Do. |
| 24-O₈ | 100,000 | | 160 | | Do. |
| 24-O₉ | 100,000 | | 320 | | Do. |
| 24-O₁₀ | 100,000 | | 640 | | Do. |
| 25-O₁ | 100,000 | 25 (I) | 10 (II) | | Do. |
| 25-O₂ | 100,000 | 3 (I) | 3 (II) | 4 (III) | Do. |
| 25-O₃ | 100,000 | 5 (II) | 25 (I) | 30 (III) | Do. |
| 25-O₄ | 100,000 | 6 (II) | 16 (I) | 28 (III) | Do. |
| 26-O₁ | 100,000 | 8 (III) | 8 (I) | 8 (I) | Do. |
| 26-O₂ | 100,000 | 6 (III) | 10 (I) | 4 (II) | Do. |
| 26-O₃ | 100,000 | 5 (II) | 15 (III) | 3 (I) | Do. |
| 26-O₄ | 100,000 | 15 (II) | 20 (I) | 6 (III) | Do. |
| 26-O₅ | 100,000 | 2 (I) | 25 (II) | 2 (III) | Do. |
| 26-O₆ | 100,000 | 4 (I) | 14 (III) | 6 (II) | Do. |

The following table presents specific illustration of compounds other than polyethyleneimine and its derivatives.

TABLE II-A.—OXYALKYLATED PRODUCTS OF POLYPROPYLENEIMINE

| Ex. | Mol. weight of polypropyleneimine | Mols of alkylene oxide per mol of polypropyleneimine | | | Physical properties |
|---|---|---|---|---|---|
| | | EtO | PrO | BuO | |
| 27-O₁ | 500 | 1 | | | Viscous liquid. |
| 27-O₂ | 500 | 5 | | | Do. |
| 27-O₃ | 500 | 10 | | | Solid. |
| 27-O₄ | 500 | 20 | | | Do. |
| 27-O₅ | 500 | 50 | | | Do. |
| 27-O₆ | 500 | 100 | | | Do. |
| 28-O₁ | 500 | | 1 | | Viscous Liquid. |
| 28-O₂ | 500 | | 5 | | Do. |
| 28-O₃ | 500 | | 10 | | Do. |
| 28-O₄ | 500 | | 20 | | Do. |
| 28-O₅ | 500 | | 50 | | Do. |
| 28-O₆ | 500 | | 100 | | Do. |
| 28-O₇ | 500 | | 200 | | Do. |
| 29-O₁ | 500 | | | 1 | Do. |
| 29-O₂ | 500 | | | 5 | Do. |
| 29-O₃ | 500 | | | 10 | Do. |
| 29-O₄ | 500 | | | 20 | Do. |
| 29-O₅ | 500 | | | 40 | Do. |
| 30-O₁ | 500 | 5 (I) | 10 (II) | | Do. |
| 30-O₂ | 500 | 10 (I) | 5 (II) | | Paste. |
| 31-O₁ | 500 | 20 (II) | 3 (I) | | Solid. |

TABLE II-A—Continued

| Ex. | Mol. weight of polypropyleneimine | Mols of alkylene oxide per mol of polypropyleneimine | | | Physical properties |
|---|---|---|---|---|---|
| | | EtO | PrO | BuO | |
| 31-O₂ | 500 | 12 (II) | 44 (I) | | Thick dark liquid. |
| 32-O₁ | 500 | 5 (III) | 10 (II) | 10 (I) | Do. |
| 32-O₂ | 500 | 10 (II) | 40 (I) | 3 (III) | Do. |
| 32-O₃ | 500 | 15 (I) | 80 (II) | 1 (III) | Do. |
| 32-O₄ | 500 | 5 (I) | 20 (III) | 2 (II) | Do. |
| 33-O | 500 | Octylene oxide, 5 mols | | | Do. |
| 34-O | 500 | Styrene oxide, 3 mols | | | Do. |
| 35-O | 500 | Epoxide 201 (Carbide and Carbon), 1 mol | | | Solid. |
| 36-O₁ | 1,000 | 1 | | | Viscous liquid. |
| 36-O₂ | 1,000 | 5 | | | Do. |
| 36-O₃ | 1,000 | 12 | | | Solid. |
| 36-O₄ | 1,000 | 18 | | | Do. |
| 36-O₅ | 1,000 | 50 | | | Do. |
| 36-O₆ | 1,000 | 100 | | | Do. |
| 36-O₇ | 1,000 | 300 | | | Waxy solid. |
| 37-O₁ | 1,000 | | 5 | | Viscous liquid. |
| 37-O₂ | 1,000 | | 10 | | Do. |
| 37-O₃ | 1,000 | | 20 | | Do. |
| 37-O₄ | 1,000 | | 40 | | Do. |
| 37-O₅ | 1,000 | | 80 | | Do. |
| 38-O₁ | 1,000 | 10 (I) | 20 (II) | | Do. |
| 38-O₂ | 1,000 | 15 (II) | 5 (I) | | Solid. |
| 39-O₁ | 1,000 | 4 (I) | 3 (II) | 2 (III) | Viscous Liquid. |
| 39-O₂ | 1,000 | 6 (I) | 15 (II) | 3 (III) | Do. |
| 39-O₃ | 1,000 | 14 (III) | 2 (II) | 8 (I) | Solid. |
| 39-O₄ | 1,000 | 10 (II) | 10 (III) | 10 (I) | Thick liquid. |
| 40-O | 1,000 | Epoxide 201 (Carbide and Carbon), 2 mols | | | Solid. |
| 41-O | 1,000 | Styrene oxide, 6 mols | | | Viscous liquid. |
| 42-O | 1,000 | Octylene oxide, 2 mols | | | Do. |
| 43-O₁ | 5,000 | 1 | | | Do. |
| 43-O₂ | 5,000 | 5 | | | Do. |
| 43-O₃ | 5,000 | 20 | | | Solid. |
| 43-O₄ | 5,000 | 45 | | | Do. |
| 43-O₅ | 5,000 | 75 | | | Do. |
| 43-O₆ | 5,000 | 125 | | | Do. |
| 44-O₁ | 5,000 | | 3 | | Viscous liquid. |
| 44-O₂ | 5,000 | | 12 | | Thick liquid. |
| 44-O₃ | 5,000 | | 35 | | Do. |
| 44-O₄ | 5,000 | | 60 | | Do. |
| 44-O₅ | 5,000 | | 100 | | Do. |
| 44-O₆ | 5,000 | | 140 | | Do. |
| 44-O₇ | 5,000 | | 200 | | Do. |
| 45-O₁ | 5,000 | 5 (III) | 40 (II) | 3 (I) | Viscous liquid. |
| 45-O₂ | 5,000 | 10 (II) | 80 (III) | 10 (I) | Do. |
| 45-O₃ | 5,000 | 20 (I) | 40 (II) | 4 (III) | Do. |
| 45-O₄ | 5,000 | 2 (I) | 4 (III) | 2 (II) | Do. |
| 46-O₁ | 5,000 | | | 1 | Do. |
| 46-O₂ | 5,000 | | | 3 | Do. |
| 46-O₃ | 5,000 | | | 10 | Do. |
| 46-O₄ | 5,000 | | | 20 | Do. |
| 46-O₅ | 5,000 | | | 40 | Do. |
| 46-O₆ | 5,000 | | | 80 | Do. |
| 47-O | 5,000 | Epichlorohydrin, 2 mols | | | Do. |
| 48-O₁ | 10,000 | 3 | | | Pasty solid. |
| 48-O₂ | 10,000 | 6 | | | Do. |
| 48-O₃ | 10,000 | 15 | | | Do. |
| 48-O₄ | 15,000 | 30 | | | Do. |
| 48-O₅ | 10,000 | 90 | | | Do. |
| 49-O₁ | 10,000 | | 2 | | Do. |
| 49-O₂ | 10,000 | | 5 | | Do. |
| 49-O₃ | 10,000 | | 20 | | Do. |
| 49-O₄ | 10,000 | | 50 | | Do. |
| 50-O₁ | 10,000 | | | 1 | Do. |
| 50-O₂ | 10,000 | | | 3 | Do. |
| 50-O₃ | 10,000 | | | 10 | Do. |
| 51-O₁ | 10,000 | 6 (II) | 10 (III) | 14 (I) | Do. |
| 51-O₂ | 10,000 | 22 (III) | 1 (II) | 4 (I) | Do. |
| 51-O₃ | 10,000 | 6 (I) | 2 (II) | 3 (III) | Do. |
| 51-O₄ | 10,000 | 5 (I) | 18 (III) | 2 (II) | Do. |
| 52-O | 10,000 | Octylene oxide, 4 mols | | | Do. |
| 53-O | 10,000 | Epoxide 201 (Carbide and Carbon), 1 mol | | | Do. |
| 54-O₁ | 20,000 | 1 | | | Waxy solid. |
| 54-O₂ | 20,000 | 5 | | | Do. |
| 54-O₃ | 20,000 | 25 | | | Do. |
| 54-O₄ | 20,000 | 75 | | | Do. |
| 54-O₅ | 20,000 | 150 | | | Do. |
| 55-O₁ | 20,000 | | 1 | | Do. |
| 55-O₂ | 20,000 | | 3 | | Do. |
| 55-O₃ | 20,000 | | 8 | | Do. |
| 55-O₄ | 20,000 | | 20 | | Do. |
| 55-O₅ | 20,000 | | 40 | | Do. |
| 55-O₆ | 20,000 | | 80 | | Do. |
| 56-O₁ | 20,000 | | | 1 | Do. |
| 56-O₂ | 20,000 | | | 2 | Do. |
| 56-O₃ | 20,000 | | | 3 | Do. |
| 56-O₄ | 20,000 | | | 5 | Do. |
| 56-O₅ | 20,000 | | | 10 | Do. |
| 56-O₆ | 20,000 | | | 20 | Do. |
| 57-O₁ | 20,000 | 6 (I) | 16 (II) | 4 (III) | Do. |
| 57-O₂ | 20,000 | 5 (III) | 40 (II) | 2 (I) | Do. |
| 57-O₃ | 20,000 | 20 (I) | 60 (II) | 5 (III) | Do. |
| 57-O₄ | 20,000 | 5 (I) | 15 (III) | 8 (II) | Do. |
| 58-O₁ | 40,000 | 2 | | | Do. |
| 58-O₂ | 40,000 | 10 | | | Do. |
| 58-O₃ | 40,000 | 15 | | | Do. |
| 58-O₄ | 40,000 | 20 | | | Do. |
| 59-O₁ | 40,000 | | 5 | | Do. |

TABLE II-A—Continued

| Ex. | Mol. weight of polypropyleneimine | Mols of alkylene oxide per mol of polypropyleneimine | | | Physical properties |
|---|---|---|---|---|---|
| | | EtO | PrO | BuO | |
| 59-O$_2$ | 40,000 | | 10 | | Do. |
| 59-O$_3$ | 40,000 | | 20 | | Do. |
| 59-O$_4$ | 40,000 | | 40 | | Do. |
| 59-O$_5$ | 40,000 | | 80 | | Do. |
| 60-O$_1$ | 40,000 | | | 1 | Do. |
| 60-O$_2$ | 40,000 | | | 3 | Do. |
| 60-O$_3$ | 40,000 | | | 10 | Do. |
| 60-O$_4$ | 40,000 | | | 20 | Do. |
| 61-O$_1$ | 40,000 | 3 (I) | 2 (III) | 6 (II) | Do. |
| 61-O$_2$ | 40,000 | 40 (I) | 5 (II) | 3 (III) | Do. |
| 61-O$_3$ | 40,000 | 3 (II) | 18 (III) | 6 (I) | Do. |
| 61-O$_4$ | 40,000 | 2 (II) | 2 (I) | 2 (III) | Do. |
| 62-O$_1$ | 40,000 | 20 (I) | 20 (II) | | Do. |
| 62-O$_2$ | 40,000 | 5 (II) | 40 (I) | | Do. |

ACYLATION THEN OXYALKYLATION

Prior acylated polyethyleneimine can be oxyalkylated in the above manner by starting with acylated polyethyleneimine instead of the unreacted polymer. Non-limiting examples are presented in the following tables. The symbol employed to designate an acylated, oxyalkylated polyethyleneimine is "AO." Specifically "1-A$_4$O$_1$" represents acylated, then oxyalkylated polyethlyeneimine.

Example 1–A$_5$O$_3$

For this example an autoclave equipped to handle alkylene oxides is necessary. 1671 grams (1 mole) of 1-A$_5$ are charged into the autoclave. Following a nitrogen purge and the addition of 75 grams of sodium methylate, the temperature is raised to 135° C. and 2436 grams of PrO (42 mols) are added. At the completion of this reaction, 440 grams of EtO (10 mols) are added and the reaction allowed to go to completion. The resulting polymer is a dark viscous fluid soluble in an aromatic solvent. Ratio of reactants 1 mole starting material/PrO 42 mols/EtO 10 mols.

Example 2–A$_4$O

For this example a conventional autoclave equipped to handle alkylene oxides is necessary. 525 grams of 2-A$_4$ (0.1 mol) are charged into the autoclave. The charge is catalyzed with 20 grams of sodium methylate, purged with nitrogen and heated to 150° C. 24.6 grams (0.2 mole) of styrene oxide are added and reacted for four hours with agitation. The resulting product is a dark extremely viscous fluid. Ratio of reactants 1 mole starting material/2 moles EtO.

These reactions and other reactions are summarized in the following table.

TABLE III.—OXYALKYLATED, PRIOR ACYLATED POLYETHYLENEIMINE
[Mols of oxide per mol of reactant]

| Example | EtO | PrO | BuO | Physical properties |
|---|---|---|---|---|
| 1-A$_5$O$_1$ | 5 | | | Viscous Liquid. |
| 1-A$_5$O$_2$ | | 22 | | Do. |
| 1-A$_5$O$_3$ | 10(II) | 42(I) | | Do. |
| 1-A$_5$O$_4$ | 14(III) | 26(I) | 10(I) | Do. |
| 1-A$_5$O$_5$ | 4(I) | 12(II) | | Do. |
| 1-A$_5$O$_6$ | | | 8 | Dark, viscous liquid. |
| 2-A$_4$O | Styrene oxide, 2 mols | | | Solid. |
| 4-A$_2$O | 24 | | | Thick liquid. |
| 5-A$_2$O | 2(I) | 4(II) | 6(III) | Do. |
| 6-A$_4$O | | 6 | | Do. |
| 9-A$_2$O | Octylene oxide, 5 mols | | | Do. |
| 10-A$_1$O$_1$ | 4(II) | 28(I) | | Solid. |
| 10-A$_1$O$_2$ | 35 | | | Viscous liquid. |
| 10-A$_1$O$_3$ | | | 10 | Do. |
| 11-A$_3$O$_1$ | | 5 | | Do. |
| 11-A$_3$O$_2$ | 8(III) | 60(II) | 2(I) | Solid. |
| 12-A$_2$O$_1$ | 12 | | | Do. |
| 12-A$_2$O$_2$ | 4(II) | 5(I) | | Do. |

The following table presents specific illustration of compounds other than polyethyleneimine and its derivatives.

TABLE III-A.—OXYALKYLATED, PRIOR ACYLATED POLYPROPYLENEIMINE

| Example | EtO | PrO | BuO | Physical properties |
|---|---|---|---|---|
| 15-A$_2$O$_1$ | | 10 | | Viscous liquid. |
| 15-A$_2$O$_2$ | 3 | | | Do. |
| 15-A$_2$O$_3$ | 2(I) | 2(II) | | Do. |
| 15-A$_2$O$_4$ | 6(II) | 10(III) | 2(I) | Do. |
| 15-A$_2$O$_5$ | | | 4 | Do. |
| 16-A$_1$O | Epoxide 201 (Carbide and Carbon), 1 mol | | | Do. |
| 17-A$_3$O$_1$ | 10(II) | 80(I) | | Do. |
| 17-A$_3$O$_2$ | | | 20 | Do. |
| 18-A$_3$O$_1$ | 3 | | | Pasty solid. |
| 18-A$_3$O$_2$ | Octylene oxide, 5 mols | | | Do. |
| 18-A$_3$O$_3$ | 20(II) | | 5(I) | Do. |
| 18-A$_3$O$_4$ | | 8 | | Do. |
| 19-A$_3$O$_1$ | Styrene oxide, 3 mols | | | Do. |
| 19-A$_3$O$_2$ | 5(III) | 40(II) | 2(I) | Do. |
| 19-A$_3$O$_3$ | 12(II) | 65(I) | | Do. |
| 20-A$_1$O$_1$ | Epichlorohydrin, 2 mols | | | Do. |
| 20-A$_1$O$_2$ | 1 | | | Do. |
| 20-A$_1$O$_3$ | | 3 | | Do. |

OXYALKYLATION THEN ACYLATION

The prior oxyalkylated polyethyleneimine can be acylated with any of the acylation agents herein disclosed (in contrast to acylation prior to oxyalkylation). Since these reactants also have hydroxy groups, acylation, in addition to reaction with amino groups noted above, also includes esterification.

The method of acylation in this instance is similar to that carried out with polyethyleneimine itself, i.e., dehydration wherein the removal of water is a test of the completion of the reaction.

Example 1–O$_1$A$_1$

One mole of 1-O$_1$ (1120 grams) in 500 ml. of xylene is mixed with three moles of acetic acid (180 grams) at room temperature. The temperature is raised slowly to 120–130° C. and refluxed gently for one hour. The temperature is then raised to 150–160° C. and heated until 3 moles of water and all of the xylene are stripped off. The dark product is water-soluble.

Example 2–O$_4$A 0.1 mole of 2-O$_4$ (380 grams) in 400 ml. of xylene is mixed with 0.1 mole of palmitic acid (25.6 grams) at room temperature. Ratio 1 mole 2-O$_4$ to 1 mole of palmitic acid. Vacuum is applied and the temperature is raised slowly until one mole of water (18 grams) is removed. This product is a dark viscous liquid.

Example 2–O$_6$A 0.1 mole of 2-O$_6$ (757 grams) is mixed with 500 grams of xylene and heated to 100° C. 0.1 mole of diglycolic acid (13.4 grams) is added slowly to prevent excessive foaming. Ratio 1 mole 2-O$_6$ to 1 mole glycolic acid. The temperature is raised to 140–150° C. and held until one mole of water has evolved. This product is the diglycolic acid fractional ester of 2-O$_6$. A white precipitate forms during this reaction which can be removed by filtration. Analysis shows the precipitate to be sodium acid diglycolate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—ACYLATED, PRIOR OXYALKYLATED POLYETHYLENEIMINE

| Example | Acylating agent | Mols of acylating agent per mol oxyalkylated PE | Ratio mols of water removed to mols acylating agent employed | Physical properties |
|---|---|---|---|---|
| 1-$O_1A_1$ | Acetic | 3 | 1 | Dark viscous liquid. |
| 1-$O_1A_2$ | Lauric | 1 | 1 | Do. |
| 1-$O_8A$ | Acetic | 2 | 1 | Solid. |
| 2-$O_3A$ | Oleic | 3 | 1 | Do. |
| 2-$O_4A$ | Palmitic | 1 | 1 | Do. |
| 2-$O_6A$ | Diglycolic | 1 | 1 | Do. |
| 4-$O_2A$ | Stearic | 2 | 1 | Do. |
| 6-$O_1A$ | Maleic anhydride. | 1 | | Viscous liquid. |
| 12-$O_2A$ | Myristic | 2 | 1 | Do. |
| 13-$O_3A$ | Abietic | 1 | 1 | Do. |
| 14-$O_6A$ | Palmitic | 2 | 1 | Do. |
| 15-$O_2A$ | Tall oil | 1 | 1 | Do. |
| 16-$O_5A$ | Diglycolic | 1 | 1 | Do. |
| 17-$O_3A$ | Oleic | 1 | 2 | Do. |
| 18-$O_5A$ | Lauric | 2 | 1 | Do. |
| 19-$O_1A$ | Ricinoleic | 1 | 1 | Do. |
| 20-$O_6A$ | Maleic anhydride. | 1 | | Do. |
| 22-$O_5A$ | Linoleic | 3 | 1 | Do. |
| 23-$O_2A$ | Palmitic | 1 | 1 | Do. |
| 24-$O_4A$ | Acetic | 1 | 1 | Do. |
| 25-$O_3A_1$ | Dimeric (Emery Indus.). | 1 | 1 | Solid. |
| 25-$O_3A_2$ | Diglycolic | 1 | 1 | Do. |
| 26-$O_1A$ | Diphenolic | 1 | 1 | Do. |
| 26-$O_5A$ | Terephthalic | 1 | 1 | Do. |
| 26-$O_6A$ | Benzoic | 1 | 1 | Do. |

The following table presents specific illustration of compounds other than polyethyleneimine and its derivatives.

TABLE IV-A.—ACYLATED, PRIOR OXYALKYLATED POLYPROPYLENEIMINE

| Example | Acylating agent | Mols of acylating agent per mol of oxyalkylated polypropyleneimine | Ratio mols of water removed to mols of acylating agent employed | Physical properties |
|---|---|---|---|---|
| 27-$O_2A$ | Oleic | 2 | 2 | Thick dark liquid. |
| 27-$O_4A$ | Diphenolic | 1 | 1 | Pasty solid. |
| 28-$O_3A$ | Lauric | 3 | 1 | Do. |
| 28-$O_6A$ | Acetic | 4 | 1 | Do. |
| 29-$O_2A$ | Naphthenic | 1 | 1 | Do. |
| 31-$O_2A$ | Stearic | 2 | 2 | Do. |
| 32-$O_4A$ | Tall oil | 1 | 1 | Do. |
| 37-$O_1A$ | Maleic anhydride. | 1 | | Do. |
| 39-$O_2A$ | Palmitic | 2 | 2 | Do. |
| 43-$O_6A$ | Dimeric (Emery Industries). | 3 | 1 | Waxy solid. |
| 44-$O_5A$ | Diglycolic | 1 | 1 | Pasty solid. |
| 45-$O_1A$ | Myristic | 2 | 1 | Do. |
| 48-$O_3A$ | Ricinoleic | 1 | 1 | Do. |
| 50-$O_1A$ | Abietic | 2 | 2 | Do. |
| 51-$O_1A$ | Linoleic | 1 | 1 | Do. |
| 57-$O_3A$ | Nonanoic | 1 | 1 | Do. |
| 59-$O_5A$ | Lauric | 1 | 1 | Waxy solid. |
| 62-$O_2A$ | Diglycolic | 1 | 1 | Do. |

HEAT TREATMENT OF OXYALKYLATED PRODUCTS

The oxyalkylated products described herein, for example, those shown in Table II relating to oxyalkylated polyethyleneimine and those in Table III relating to oxyalkylated, prior acylated, polyethyleneimine can be heat treated to form useful compositions.

In general, the heat treatment is carried out at 200–250° C. Under dehydrating conditions, where reduced pressure and a fast flow of nitrogen is used, lower temperatures can be employed, for example 150–200° C.

Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly less than 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc. fosters the reaction.

The following examples are presented to illustrate heat treatment. The symbol used to designate a heat treated oxyalkylated polyethyleneimine is "OH" and an acylated, oxyalkylated product is "AOH." In all examples 500 grams of starting material are employed.

*Example 2-$O_1H$*

A conventional glass resin vessel equipped with a stirrer and water trap is used. Five hundred grams of 2-$O_1$ are charged into the above resin vessel along with five grams of $CaCl_2$. The temperature is raised to 225–250° C. and heated until 57 grams of water (3.2 mols) are evolved. This process takes 7.5 hours of heating. The product is an extremely viscous material at room temperature. However, upon warming slightly this product dissolves easily in water.

*Example 19-$O_3H$*

The process of the immediately previous example is repeated using 19-$O_3$ but substituting sodium methylate for calcium chloride. The product is a dark, viscous, water-soluble material.

*Example 15-$O_6H$*

The process of Example 2-$O_1H$ is repeated using 15-$O_6$ but substituting powdered iron for calcium chloride.

TABLE V.—HEAT TREATED (1) OXYALKYLATED AND (2) ACYLATED, OXYALKYLATED POLYETHYLENEIMINE

| Example | Reaction Temp.,° C. | Catalyst (5 grams) | Water Removed | | Time in hours | Physical properties |
|---|---|---|---|---|---|---|
| | | | Grams | Mols | | |
| 1-O$_2$H | 250 | Iron | 74 | 4.1 | 8.0 | Dark, viscous liquid. |
| 2-O$_1$H | 225 | CaCl$_2$ | 57 | 3.2 | 16.5 | Do. |
| 3-O$_2$H | 265 | Sodium methylate | 36 | 2.0 | 23 | Do. |
| 7-OH | 270 | CaCl$_2$ | 38 | 2.1 | 30 | Do. |
| 10-O$_2$H | 255 | Iron | 95 | 5.3 | 9.5 | Solid. |
| 11-O$_1$H | 240 | do | 32 | 1.8 | 12 | Viscous liquid. |
| 12-O$_3$H | 260 | do | 40 | 2.2 | 13 | Do. |
| 13-O$_4$H | 250 | CaCl$_2$ | 72 | 4 | 18 | Do. |
| 14-O$_1$H | 200 | Iron oleate | 54 | 3 | 24 | Do. |
| 15-O$_6$H | 265 | CaCl$_2$ | 90 | 5 | 30 | Do. |
| 16-O$_4$H | 255 | Iron | 54 | 3 | 16 | Do. |
| 17-O$_1$H | 235 | do | 36 | 2 | 18 | Do. |
| 19-O$_3$H | 275 | Sodium methylate | 76 | 4.2 | 20 | Solid. |
| 20-O$_1$H | 255 | Iron | 54 | 3 | 16 | Viscous liquid. |
| 22-O$_5$H | 265 | do | 63 | 3.5 | 8 | Do. |
| 23-O$_3$H | 255 | do | 57 | 3.2 | 12 | Do. |
| 24-O$_4$H | 250 | do | 36 | 2 | 14 | Do. |
| 25-O$_2$H | 260 | do | 38 | 2.1 | 11 | Do. |
| 26-O$_1$H | 265 | do | 40 | 2.2 | 13 | Do. |
| 1-A$_3$O$_1$H | 225 | Sodium methylate | 36 | 2.0 | 16 | Paste. |
| 5-A$_2$OH | 240 | Iron | 40 | 2.2 | 8 | Do. |
| 11-A$_3$O$_1$H | 235 | Iron oleate | 90 | 5 | 14 | Do. |
| 12-A$_2$O$_2$H | 260 | CaCl$_2$ | 32 | 1.8 | 18 | Do. |

The following table presents specific illustration of compounds other than polyethyleneimine and its derivatives.

TABLE V-A.—HEAT TREATED (1) OXYALKYLATED AND (2) ACYLATED, OXYALKYLATED POLYPROPYLENEIMINE

| Example | Reaction Temp.,° C. | Catalyst (5 grams) | Water Removed | | Time in hours | Physical properties |
|---|---|---|---|---|---|---|
| | | | Grams | Mols | | |
| 27-O$_3$H | 260 | CaCl$_2$ | 32 | 1.8 | 18 | Dark, viscous liquid. |
| 28-O$_5$H | 240 | Iron Oleate | 40 | 2.2 | 8 | Do. |
| 29-O$_2$H | 265 | Iron | 40 | 2.2 | 13 | Do. |
| 30-O$_1$H | 250 | Sodium Methylate | 36 | 2.0 | 14 | Do. |
| 32-O$_1$H | 265 | Iron | 63 | 3.5 | 8 | Do. |
| 36-C$_3$H | 275 | do | 76 | 4.2 | 20 | Do. |
| 37-O$_1$H | 255 | do | 54 | 3.0 | 16 | Do. |
| 43-O$_3$H | 200 | do | 54 | 3.0 | 24 | Pasty. |
| 46-O$_3$H | 260 | do | 40 | 2.2 | 13 | Viscous liquid. |
| 47-O$_1$H | 260 | Iron Oleate | 95 | 5.3 | 9.5 | Do. |
| 48-O$_4$H | 255 | Ferric Chloride | 36 | 2.0 | 23 | Do. |
| 51-O$_3$H | 270 | Iron | 74 | 4.1 | 8.0 | Do. |
| 52-O$_1$H | 225 | Aluminum Chloride | 32 | 1.8 | 18 | Do. |
| 55-O$_3$H | 250 | CaCl$_2$ | 90 | 5.0 | 14 | Do. |
| 56-O$_4$H | 235 | Sodium Methylate | 36 | 2.0 | 16 | Do. |
| 58-O$_2$H | 240 | Iron | 38 | 2.1 | 11 | Do. |
| 15-A$_2$O$_1$H | 255 | do | 57 | 3.2 | 12 | Paste. |
| 17-H$_3$O$_2$H | 245 | do | 54 | 3.0 | 16 | Do. |
| 19-A$_3$O$_1$H | 270 | Iron Oleate | 36 | 2.0 | 18 | Do. |
| 20-A$_1$O$_1$H | 265 | CaCl$_2$ | 90 | 5.0 | 30 | Do. |
| 20-A$_1$O$_3$H | 255 | Iron | 32 | 1.8 | 12 | Do. |

ALKYLATION

Alkylation relates to the reaction of polyethyleneimine and derivatives thereof with alkylating agents.

Any hydrocarbon halide, e.g. alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethyl ether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-Chlorowax have been set forth in United States Patent 2,238,790.

Since the reaction between the alkyl halide reactant and polyethyleneimine is a condensation reaction, or an alkylation reaction, characterized by the elimination of hydrogen halide, the general conditions for such reactions are applicable herein. For certain uses it is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and polyethyleneimine in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and polyethyleneimine is dependent on the weight of the charge, the reaction temperature selected, and the means employed for removing the hydrogen halide from the reaction mixture. In practice, the reaction is continued until no more hydrogen halide is formed. In general, the time of reaction will vary widely, such as between about four and about ten hours.

It can be postulated that the reaction between the alkyl halide reactant and polyethyleneimine results in the formation of products where the alkyl group of the alkyl halide has replaced a hydrogen atom attached to a nitrogen atom. It is also conceivable that alkylation of an alkylene group of polyethyleneimine can occur. However, the exact composition of any given reaction product cannot be predicted. For example, when two moles of butyl bromide are reacted with one mole of polyethyleneimine 900, a mixture of mono-, di- and tri- and higher N-alkylated products can be produced. Likewise, the alkyl groups can be substituted on different nitrogen atoms in different molecules of polyethyleneimine.

Thus, the term "alkylation" as employed herein and in the claims include alkenylation, cycloalkenylation, aralkylation, etc., and other hydrocarbonylation as well as alkylation itself.

In general, the following examples are prepared by reacting the alkyl halide with the polyethyleneimine at the desired ratio in the presence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate alkylation of polyethyleneimine.

In these examples, the term "mesomer" is employed. A mesomer is defined as a *repeating radical* which, when combined with other mesomers, forms the principal portion of the polymer molecule.

Thus, the unit

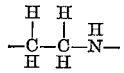

is the "mesomer" of polyethyleneimine, since polyethyleneimine may be represented by the formula

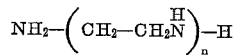

Example 5–K₂

430 grams of polyethyleneimine 50,000, equivalent to 10 mesomeric units of ethyleneimine, in 500 ml. of xylene and 570 grams of sodium carbonate, equivalent to 8 moles, are placed in a reaction vessel equipped with a mechanical stirrer, a thermometer and a reflux condenser take-off for removal of volatile components. The stirred reactants are heated to about 100° C. whereupon 1140 g. (8 mols) of dichloroethyl ether is started in slowly at such a rate that the temperature of the reaction vessel contents never exceeds 165° C., but preferably stays around 135° C. The reaction is exothermic and 5–6 hours are required to add all the dichloroethyl ether. After all the dichloroethyl ether has been added, the temperature is allowed to drop to about 90–100° whereupon reduced pressure is applied to the reaction vessel and all xylene stripped out. The material left in the vessel is a thick brown liquid which solidifies upon cooling to a glassy-solid.

Example 8–A₁

The equivalent of 8 mesomeric units, based on polyethyleneimine, of the material 8–A₁ (Table I) in 300 g. xylene is placed in a reaction vessel described in the above example for 5–K₂. 340 grams anhydrous sodium carbonate, equivalent to 3.2 moles are added followed by 1.6 moles dimethyl sulfate. The temperature is then brought up to 125° C. and held there for a period of 6–8 hours. Xylene is then removed under reduced temperature and pressure conditions as in the example for 5–K₂. The resulting product, a dark amber material, is very viscous at ordinary temperature.

Example 20–O₁HK

The equivalent of 10 mesomeric units based on polyethyleneimine of the material 20–O₁H (Table V) in 300 ml. of xylene and 420 grams sodium bicarbonate, equivalent to 5 moles, are placed in an autoclave equipped with a stirring device, a thermometer and a condenser reflux device which can be closed off from the autoclave during reactions in which pressures above atmosphere are experienced. The autoclave is closed and heat is applied to bring up the temperature to 120–130° C. at which time 5 mols methyl chloride are added slowly while never allowing pressure to exceed 5 atmospheres pressure. Several hours will be necessary to get all methyl chloride in and pressure inside the vessel down to one atmosphere. At this point the reflux condenser is opened, the temperature is allowed to drop to 90–100° C. and a slight vacuum applied in order to reflux the xylene out of the autoclave. The resulting material is a very viscous amber colored liquid.

The reactions shown in the following table are carried out in a similar manner. Each reaction in the table is carried out in two ways—(1) in the presence of base, as in 5–K₂ to yield the alkylation product and (2) in the absence of base to yield the halogen-containing or sulfate-containing (5–K₂X) products.

The alkylated products of this invention contain primary, secondary, tertiary, and quaternary amino groups. By controlling the amount of alkylation agent employed and the conditions of the reaction, etc., one can control the type and amount of alkylation. For example, by reaction less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with polyethyleneimine will depend on the number of alkylation reactive positions contained therein as well as the number of moles of alkylating agent one wishes to incorporate into the molecule. Theoretically, every hydrogen bonded to a nitrogen atom can be alkylated. We have advantageously reacted 1–20 moles of alkylating agent per moles of polyethyleneimine 900 but preferably 1–12 moles. With polyethyleneimine 20,000 greater amounts of alkylating agent can be employed, for example 1–50 moles, and with polyethyleneimine 40,000, 1–100 moles, etc. Optimum alkylation will depend on the particular application.

In addition, the alkyl halide may contain functional groups. For example, chloroacetic acid can be reacted with polyethyleneimine to yield a compound containing carboxylic acid groups.

PN—CH₂COOH, wherein P is the residue of polyethyleneimine.

In addition, polyethyleneimine can be alkylated with an alkyl halide such as alkyl chloride and then reacted with chloroacetic acid to yield an alkylated polyethyleneimine containing carboxylic acid groups

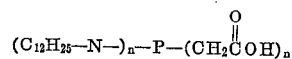

The symbol employed to designate an alkylated polyethyleneimine is "K." Where the product is a salt or a quaternary the symbol is "KX." Thus, for example, where no acceptor base is employed and a salt is allowed to form 1–A$_5$O$_5$K would be 1–A$_5$O$_5$KX.

The following table presents specific illustration of compounds other than polyethyleneimine and its derivatives.

TABLE VI.—ALKYLATED PRODUCTS

| Example | Mol. wt. PE | Alkylating agent | Mols alkylating agent per mesomer unit | Physical properties |
|---|---|---|---|---|
| 1–K$_1$ | 900 | Allyl chloride | 0.2 | Viscous liquid. |
| 1–K$_2$ | 900 | ----do---- | 0.7 | Do. |
| 1–K$_3$ | 900 | Benzyl chloride | 0.3 | Do. |
| 1–K$_4$ | 900 | ----do---- | 0.8 | Solid. |
| 2–K$_1$ | 5,000 | Methyl chloride | 0.3 | Viscous liquid. |
| 2–K$_2$ | 5,000 | ----do---- | 1.0 | Solid. |
| 2–K$_3$ | 5,000 | Ethylene dichloride | 0.2 | Viscous liquid. |
| 2–K$_4$ | 5,000 | ----do---- | 0.5 | Do. |
| 3–K$_1$ | 11,500 | 1,4-dichlorobutene-2 | 0.2 | Do. |
| 3–K$_2$ | 11,500 | ----do---- | 0.5 | Do. |
| 3–K$_3$ | 11,500 | Dimethyl sulfate | 0.2 | Do. |
| 3–K$_4$ | 11,500 | ----do---- | 0.4 | Do. |
| 4–K$_1$ | 20,000 | Dodecylbenzene chloride | 0.2 | Solid. |
| 4–K$_2$ | 20,000 | ----do---- | 0.5 | Do. |
| 4–K$_3$ | 20,000 | Butyl chloride | 0.3 | Viscous liquid. |
| 4–K$_4$ | 20,000 | ----do---- | 0.6 | Do. |
| 5–K$_1$ | 50,000 | Dichlorodiethyl ether | 0.2 | Do. |
| 5–K$_2$ | 50,000 | ----do---- | 0.8 | Solid. |
| 5–K$_3$ | 50,000 | Benzyl chloride | 0.3 | Viscous liquid. |
| 5–K$_4$ | 50,000 | ----do---- | 0.8 | Solid. |
| 6–K$_1$ | 100,000 | Ethylene dichloride | 0.2 | Viscous liquid. |
| 6–K$_2$ | 100,000 | ----do---- | 0.8 | Do. |
| 6–K$_3$ | 100,000 | Methyl chloride | 0.3 | Do. |
| 6–K$_4$ | 100,000 | ----do---- | 1.0 | Solid. |
| 1–A$_7$K | | 1,4-xylidene chloride | 0.2 | Viscous liquid. |
| 2–A$_4$K | | ----do---- | 0.2 | Do. |
| 3–A$_3$K | | Dodecenyl chloride | 0.2 | Solid. |
| 4–A$_2$K | | Methyl chloride | 0.5 | Viscous liquid. |
| 6–A$_4$K | | Benzyl chloride | 0.4 | Solid. |
| 8–A$_1$K | | Dimethyl sulfate | 0.2 | Viscous liquid. |
| 12–A$_2$K | | Dichlorodiethyl ether | 0.4 | Do. |
| 1–O$_2$K | | 1,4-dichlorobutene-2 | 0.3 | Do. |
| 2–O$_1$K | | Benzyl chloride | 0.4 | Solid. |
| 3–O$_2$K | | Methyl chloride | 0.7 | Do. |
| 4–O$_1$K | | Ethylene dichloride | 0.2 | Viscous liquid. |
| 6–O$_2$K | | Benzyl chloride | 0.4 | Solid. |
| 11–O$_2$K | | Dimethyl sulfate | 0.2 | Viscous liquid. |
| 14–O$_1$K | | Dichlorodiethyl ether | 0.4 | Solid. |
| 16–O$_4$K | | Methyl chloride | 0.6 | Do. |
| 19–O$_2$K | | Dodecyl benzyl chloride | 0.2 | Do. |
| 19–O$_4$K | | 1,4-xylylene dichloride | 0.2 | Viscous liquid. |
| 20–O$_1$K | | Benzyl chloride | 0.5 | Solid. |
| 22–O$_5$K | | Methyl chloride | 0.6 | Do. |
| 23–O$_4$K | | Dodecenyl chloride | 0.2 | Do. |
| 24–O$_4$K | | Ethylene dichloride | 0.3 | Viscous liquid. |
| 1–A$_5$O$_1$K | | 1,4-dichlorobutene-2 | 0.2 | Do. |
| 1–A$_5$O$_5$K | | Benzyl chloride | 0.4 | Solid. |
| 5–A$_2$OK | | Dichlorodiethyl ether | 0.4 | Do. |
| 12–A$_2$O$_2$K | | Methyl chloride | 0.5 | Do. |
| 1–O$_1$A$_1$K | | Octadecyl chloride | 0.2 | Do. |
| 2–O$_6$AK | | Benzyl chloride | 0.4 | Do. |
| 14–O$_6$AK | | Dichlorodiethyl ether | 0.3 | Viscous liquid. |
| 22–O$_5$AK | | Methyl chloride | 0.6 | Do. |
| 26–O$_5$AK | | Benzyl chloride | 0.6 | Solid. |
| 1–O$_2$HK | | ----do---- | 0.4 | Do. |
| 7–OHK | | Dichlorodiethyl ether | 0.2 | Viscous liquid. |
| 11–O$_1$HK | | Ethylene dichloride | 0.2 | Do. |
| 20–O$_1$HK | | Methyl chloride | 0.5 | Do. |
| 25–O$_2$HK | | Dimethyl sulfate | 0.2 | Do. |

TABLE VI-A.—ACYLATED PRODUCTS

| Example | Mol. wt. of PE | Alkylating agent | Mols of alkylating agent per mesomer unit | Physical properties |
|---|---|---|---|---|
| 7–K$_1$ | 500 | Allyl chloride | 0.2 | Viscous liquid. |
| 7–K$_2$ | 500 | ----do---- | 0.7 | Do. |
| 7–K$_3$ | 500 | Benzyl chloride | 0.3 | Do. |
| 7–K$_4$ | 500 | ----do---- | 0.8 | Do. |
| 8–K$_1$ | 1,000 | Methyl chloride | 0.7 | Do. |
| 8–K$_2$ | 1,000 | ----do---- | 1.0 | Do. |
| 8–K$_3$ | 1,000 | Ethylene dichloride | 0.2 | Do. |
| 8–K$_4$ | 1,000 | ----do---- | 0.5 | Do. |
| 9–K$_1$ | 5,000 | ----do---- | 0.2 | Do. |
| 9–K$_2$ | 5,000 | Dimethyl sulfate | 0.5 | Do. |
| 9–K$_3$ | 5,000 | ----do---- | 0.2 | Do. |
| 9–K$_4$ | 5,000 | ----do---- | 0.4 | Do. |
| 10–K$_1$ | 10,000 | Dodecylbenzene chloride | 0.2 | Solid. |
| 10–K$_2$ | 10,000 | ----do---- | 0.5 | Do. |
| 10–K$_3$ | 10,000 | Butyl chloride | 0.3 | Do. |
| 10–K$_4$ | 10,000 | ----do---- | 0.6 | Do. |
| 11–K$_1$ | 20,000 | Dichlorodiethyl ether | 0.2 | Do. |
| 11–K$_2$ | 20,000 | ----do---- | 0.8 | Do. |
| 11–K$_3$ | 20,000 | Benzyl chloride | 0.3 | Do. |
| 11–K$_4$ | 20,000 | ----do---- | 0.8 | Do. |
| 12–K$_1$ | 40,000 | Methyl chloride | 0.3 | Do. |
| 12–K$_2$ | 40,000 | ----do---- | 0.8 | Do. |
| 12–K$_3$ | 40,000 | Allyl chloride | 0.5 | Do. |
| 15–A$_2$K | | Dimethyl sulfate | 0.8 | Viscous liquid. |
| 16–A$_3$K | | Methyl chloride | 0.3 | Do. |
| 17–A$_1$K | | Ethylene dichloride | 0.8 | Do. |
| 18–A$_3$K | | Dichlorodiethyl ether | 0.2 | Solid. |
| 19–A$_2$K | | Benzyl chloride | 0.6 | Do. |
| 20–A$_1$K | | 1,4-dichlorobutene-2 | 0.3 | Do. |
| 27–O$_4$K | | Dodecenyl chloride | 0.5 | Viscous liquid. |
| 28–O$_2$K | | Benzyl chloride | 0.2 | Do. |
| 29–O$_3$K | | 1,4-xylylene dichloride | 1.0 | Do. |
| 36–O$_4$K | | Dodecyl benzene chloride | 0.8 | Do. |
| 44–O$_5$K | | Dimethyl sulfate | 0.3 | Solid. |
| 50–O$_2$K | | Ethylene dichloride | 0.7 | Do. |
| 51–O$_2$K | | Butyl chloride | 0.2 | Do. |
| 55–O$_3$K | | Allyl chloride | 0.5 | Do. |
| 61–O$_2$K | | Benzyl chloride | 0.3 | Viscous liquid. |
| 15–A$_2$O$_4$K | | Methyl chloride | 1.0 | Solid. |
| 19–A$_3$O$_1$K | | Ethylene dichloride | 0.6 | Do. |
| 19–A$_3$O$_3$K | | Dichloro pentane | 0.5 | Do. |
| 27–O$_2$AK | | Dichlorodiethyl ether | 0.2 | Do. |
| 44–O$_5$AK | | Dimethyl sulfate | 1.0 | Do. |
| 51–O$_4$AK | | Methyl chloride | 0.8 | Do. |
| 46–O$_3$HK | | Allyl chloride | 0.5 | Do. |
| 20–A$_1$O$_2$HK | | Butyl chloride | 0.2 | Do. |

In addition to the above examples wherein a base acceptor is employed to remove the acid anion such as halogen, sulfate, etc., the above examples are also prepared omitting the inorganic base from the reaction medium. When this is done, a halogen containing salt, quaternary, etc. is formed. Examples where such salts are formed will be designated as above except that they will contain an "X" designation for example instead of 1–O$_1$A$_1$K they will be 1–O$_1$A$_1$KX, and instead of 22–O$_5$AK they will be 22–O$_5$AKX, etc. "X" indicates salt formation.

ALKYLATED, THEN ACYLATION

The alkylated material prepared above can be further treated with acylating agent where residual acylatable amino groups are still present on the molecule. The acylation procedure is essentially that described above wherein carboxylic acids react with the alkylated polyethyleneimine under dehydrating conditions to form amides and cyclic amidines. The product depends on the ratio of moles of water removed for each carboxylic acid group, i.e., 1 mole water/1 mole carboxylic essentially amides; more than 1 mole water/1 mole carboxylic acid group, essentially cyclic amidines, such as imidazolines.

Such compounds are illustrated in the following table. The symbol employed to designate alkylated, acylated products is "KA" and acylated, alkylated, acylated products is "AKA."

TABLE VII.—ACYLATED, PRIOR ALKYLATED POLYETHYLENEIMINE OR DERIVATIVE

| Example | Acylating Agent | Ratio mols acylating agent per mol polyethyleneimine deriv. | Mols of water removed per mole of reactant | Physical properties |
|---|---|---|---|---|
| 1-K$_2$A | Lauric | 4:1 | 1 | Viscous liquid. |
| 2-K$_3$A | Oleic | 1:1 | 1.5 | Do. |
| 3-K$_1$A | Palmitic | 1:1 | 1 | Do. |
| 4-K$_1$A | Dimeric | 0.5:1 | 1 | Solid. |
| 5-K$_1$A | Nonanoic | 2:1 | 1 | Viscous liquid. |
| 5-K$_2$A | Ricinoleic | 2:1 | 1.8 | Do. |
| 5-K$_3$A | Succinic anhydride alkyl (C$_{12}$). | 2:1 | 1 | Do. |
| 5-K$_4$A | Stearic | 1:1 | 1.5 | Solid. |
| 6-K$_3$A | Myristic | 2:1 | 1 | Viscous liquid. |
| 2-A$_4$KA | Acetic | 2:1 | 1 | Do. |
| 6-A$_4$KA | Diglycolic | 1:1 | 1 | Do. |
| 2-O$_1$KA | Lauric | 2:1 | 1 | Viscous liquid. |
| 1-O$_2$KA | Oleic | 2:1 | 1.3 | Do. |
| 1-O$_2$HKA | Maleic anhydride. | 1:1 |  | Solid. |

The following table presents specific illustrations of compounds other than polyethyleneimine and its derivatives.

TABLE VII-A.—ACYLATED, PRIOR ALKYLATED POLYPROPYLENEIMINE OR DERIVATIVE

| Example | Acylating Agent | Ratio mols of acylating agent per mol of polypropyleneimine deriv. | Mols of water removed per mol of reactant | Physical properties |
|---|---|---|---|---|
| 7-K$_2$A | Myristic | 2:1 | 1 | Viscous liquid. |
| 8-K$_3$A | Acetic | 2:1 | 1 | Do. |
| 9-K$_1$A | Diglycolic | 1:1 | 1 | Do. |
| 10-K$_1$A | Lauric | 2:1 | 1 | Do. |
| 11-K$_2$A | Oleic | 2:1 | 1.3 | Do. |
| 12-K$_1$A | Maleic anhydride. | 1:1 |  | Solid. |
| 16-A$_3$KA | Lauric | 4:1 | 1 | Viscous liquid. |
| 20-A$_1$KA | Oleic | 1:1 | 1.5 | Do. |
| 28-O$_2$KA | Palmitic | 1:1 | 1 | Do. |
| 44-O$_5$KA | Dimeric | 0.5:1 | 1 | Do. |
| 61-O$_2$KA | Nonanoic | 2:1 | 1 | Do. |
| 15-A$_2$O$_4$KA | Ricinoleic | 2:1 | 1.8 | Do. |
| 19-A$_3$O$_3$KA | Alkyl succinic anhydride (C$_{12}$). | 2:1 |  | Solid. |
| 44-O$_5$AKA | Stearic | 1:1 | 1 | Viscous liquid. |
| 46-O$_3$HKA | Myristic | 2:1 | 1 | Do. |
| 20-A$_1$O$_2$HKA | Acetic | 1:1 | 1 | Do. |

OLEFINATION

Olefination relates to the reaction of polyethyleneimine and derivatives with olefins.

The compositions of this invention, including polyethyleneimine itself as well as reaction products thereof containing active hydrogens, can be reacted with unsaturated compounds, particular compounds containing activated double bonds, so as to add polyethyleneimine across the double bonds as illustrated herein:

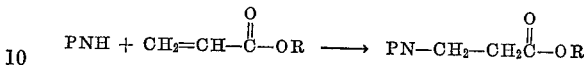

Where the compound contains an additional active hydrogen, other unsaturated molecules can be added to the original molecule for example:

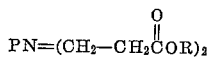

Where one or more active hydrogens are present at another reactive site, the following reaction could take place:

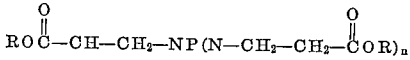

The reaction is carried out in the conventional manner such as illustrated, for example, in "Synthetic Organic Chemistry," Wagner & Zook (Wiley, 1953), page 673.

Non-limiting examples of unsaturated compounds which can be reacted with the polyamine and derivatives thereof including the following—acrylonitrile, acrylic and methacrylic acids and esters, crotonic acid and esters, cinnamic acid and esters, styrene, styrene derivatives and related compounds, butadiene, vinyl ethers, vinyl ketones, maleic esters, vinyl sulfones, etc.

In addition, polyethyleneimine and derivatives thereof containing active hydrogens can be used to prepare telomers of polymer prepared from vinyl monomers.

The following are examples of olefination. The symbol employed to designate olefination is "U" and alkylation, olefination "KU."

Example 1–U$_1$

The olefination reaction is carried out in the usual glass resin apparatus. Since the reaction is that of a double bond with an active hydrogen, no water is eliminated. The reaction is relatively simple, as shown by the following example:

Charge 900 grams of polyethyleneimine 900 in xylene (1 mol) into glass resin apparatus. Care should be taken that the PEI 900 is water-free, to eliminate undesirable side reactions. At room temperature, slowly add 53 grams of acrylonitrile (1 mol). The reaction proceeds smoothly without the aid of a catalyst. Warm gently to 80–100° C. and stir for one hour.

Example 6–U$_1$

To 1,000 grams of polyethyleneimine 100,000 (0.1 mol) in 300 grams of xylene, add 1.24 grams of divinyl sulfone (0.01 mol) at room temperature. This reaction is exothermic and the ambient temperature is employed.

Example 2–O$_1$KAU

Same reactions as Example 1–U except that 1 mol of methyl acrylate is substituted for acrylonitrile and 2-O$_1$KA is substituted for the polyethyleneimine 900. Part of this product is thereupon saponified with sodium hydroxide to form the fatty amino acid salt.

Further examples of the reaction are summarized in the following table:

TABLE VIII.—OLEFINATION

| Example | Mol. weight of polyethyleneimine | Olefin | Mols of olefin per mol PE | Time | Temp., °C. |
|---|---|---|---|---|---|
| 1-U₁ | 900 | Acrylonitrile | 1:1 | 1 hr | 80–100 |
| 1-U₂ | 900 | Methylacrylate | 2:1 | 1 hr | 80–100 |
| 1-U₃ | 900 | Styrene | 3:1 | 2 hrs | 90 |
| 2-U₁ | 5,000 | Ethyl cinnamate | 2:1 | 3 hrs | 120 |
| 2-U₂ | 5,000 | Ethyl crotonate | 2:1 | 3 hrs | 125 |
| 2-U₃ | 5,000 | Dioctyl maleate | 2:1 | 2 hrs | 100 |
| 3-U₁ | 11,500 | Divinyl sulfone | 1:1 | 1 hr | 70 |
| 3-U₂ | 11,500 | Styrene | 1:1 | 30 min | 90 |
| 3-U₃ | 11,500 | Lauryl methacrylate | 2:1 | 3 hrs | 135 |
| 4-U₁ | 20,000 | Divinyl sulfone | 1:1 | 1 hr | 80–100 |
| 4-U₂ | 20,000 | Methyl methacrylate | 1:1 | 1 hr | 80–100 |
| 4-U₃ | 20,000 | Acrylonitrile | 3:1 | 30 min | 80–100 |
| 5-U₁ | 50,000 | Methylacrylate | 3:1 | 1 hr | 80–100 |
| 5-U₂ | 50,000 | Acrylonitrile | 3:1 | 1 hr | 80–100 |
| 5-U₃ | 50,000 | Styrene | 3:1 | 1 hr | 90 |
| 6-U₁ | 100,000 | Divinyl sulfone | 1:1 | 1 hr | 70 |
| 6-U₂ | 100,000 | Ethyl crotonate | 2:1 | 2 hrs | 125 |
| 6-U₃ | 100,000 | Dioctyl maleate | 2:1 | 1 hr | 100 |

| Example | Olefin | Mols of olefin per Mol PE | Time | Temp., °C. |
|---|---|---|---|---|
| 1-A₆U | Styrene | 1:1 | 1 hr | 90 |
| 2-A₄U | Divinyl sulfone | 1:1 | 1 hr | 70 |
| 3-A₄U | Methylacrylate | 1:1 | 1 hr | 80–100 |
| 6-A₄U | Divinyl sulfone | 1:1 | 1 hr | 70 |
| 8-A₂U | Styrene | 3:1 | 2 hrs | 90 |
| 13-A₁U | Dimethyl maleate | 1:1 | 1 hr | 100 |
| 1-O₁U | Dioctyl maleate | 2:1 | 1 hr | 100 |
| 2-O₁U | Ethyl crotonate | 2:1 | 2 hrs | 125 |
| 3-O₁U | Divinyl sulfone | 1:1 | 1 hr | 70 |
| 4-O₁U | Styrene | 4:1 | 1 hr | 90 |
| 19-O₁U | Acrylonitrile | 3:1 | 1 hr | 80–100 |
| 20-O₁U | Methylacrylate | 3:1 | 1 hr | 80–100 |
| 22-O₅U | Acrylonitrile | 3:1 | 30 min | 80–100 |
| 23-O₁U | Methyl methacrylate | 1:1 | 1 hr | 80–100 |
| 24-O₁U | Divinyl sulfone | 1:1 | 1 hr | 70 |
| 1-A₅O₁U | Lauryl methacrylate | 2:1 | 3 hrs | 135 |
| 23-O₂AU | Divinyl sulfone | 1:1 | 1 hr | 70 |
| 14-O₁HU | Dioctyl maleate | 2:1 | 2 hrs | 100 |
| 4-K₄U | Ethyl crotonate | 2:1 | 3 hrs | 125 |
| 4-K₁U | Ethyl cinnamate | 2:1 | 3 hrs | 120 |
| 2-A₄KAU | Styrene | 3:1 | 2 hrs | 90 |
| 2-O₁KAU | Methylacrylate | 2:1 | 1 hr | 80–100 |
| 1-O₂HKAU | Acrylonitrile | 1:1 | 1 hr | 80–100 |

The following table presents specific illustration of compounds other than polyethyleneimine and its derivatives.

TABLE VIII-A.—OLEFINATION OF POLYPROPYLENEIMINE

| Example | Molecular weight of polypropyleneimine | Olefin | Mols of olefin per mol of polypropyleneimine | Time in hours | Temp., °C. |
|---|---|---|---|---|---|
| 7-U₁ | 500 | Styrene | 1:1 | 1 | 90 |
| 7-U₂ | 500 | Divinyl sulfone | 1:1 | 1 | 70 |
| 7-U₃ | 500 | Acrylonitrile | 2:1 | 1 | 80–100 |
| 8-U₁ | 1,000 | Dioctyl maleate | 1:1 | 2 | 120 |
| 8-U₂ | 1,000 | Methylacrylate | 1:1 | 1 | 110 |
| 8-U₃ | 1,000 | Ethyl cinnamate | 3:1 | 2 | 125 |
| 9-U₁ | 5,000 | Lauryl methacrylate | 1:1 | 3 | 130 |
| 9-U₂ | 5,000 | Ethyl crotonate | 4:1 | 3 | 120 |
| 9-U₃ | 5,000 | Acrylonitrile | 4:1 | 1 | 80–100 |
| 10-U₁ | 10,000 | Styrene | 2:1 | 1 | 90 |
| 10-U₂ | 10,000 | Divinyl sulfone | 1:1 | 1 | 80 |
| 10-U₃ | 10,000 | Methylacrylate | 2:1 | 1 | 100 |
| 11-U₁ | 20,000 | Lauryl methacrylate | 2:1 | 3 | 110 |
| 11-U₂ | 20,000 | Styrene | 2:1 | 1 | 90 |
| 11-U₃ | 20,000 | Divinyl sulfone | 1:1 | 1 | 80 |
| 12-U₁ | 40,000 | Methyl acrylate | 2:1 | 2 | 120 |
| 12-U₂ | 40,000 | Acrylonitrile | 3:1 | 1 | 80 |
| 12-U₃ | 40,000 | Dioctyl maleate | 1:1 | 4 | 110 |

CARBONYLATION

Carbonylation relates to the reaction of polyethyleneimine and derivatives thereof with aldehydes and ketones.

Where primary amino groups are present on the polyethyleneimine reactants, Schiff's bases can be formed on reaction with carbonyl compounds. For example, where an aldehyde such as salicylaldehyde is reacted with polyethyleneimine 900 in a ratio of 2 moles of aldehyde to 1 mole of PE 900, the following type of compound could be formed:

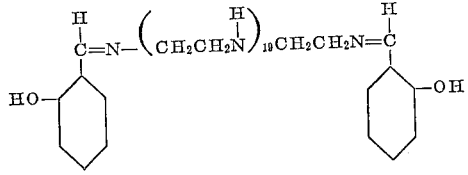

Lesser molar ratios of aldehyde to polyamine would yield mono-Schiff's base such as

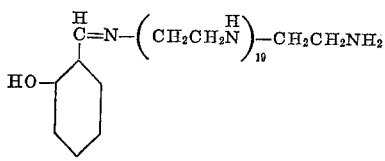

etc., and other isomeric configurations, such as where the Schiff's base is present on the non-terminal amino group rather than on the terminal amino group, etc.

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following.

Aldehydes:
  Benzaldehyde
  2-methylbenzaldehyde
  3-methylbenzaldehyde
  4-methylbenzaldehyde
  2-methoxybenzaldehyde
  4-methoxybenzaldehyde
  α-Naphthaldehyde
  β-Naphthaldehyde
  4-phenylbenzaldehyde
  Propionaldehyde
  n-Butyraldehyde
  Heptaldehyde
  Aldol
  2-hydroxybenzaldehyde
  2-hydroxy-6-methylbenzaldehyde
  2-hydroxy-3-methoxybenzaldehyde
  2-4-dihydroxybenzaldehyde
  2-6-dihydroxybenzaldehyde
  2-hydroxynaphthaldehyde-1
  1-hydroxynaphthaldehyde-2
  Anthrol-2-aldehyde-1
  2-hydroxyfluorene-aldehyde-1
  4-hydroxydiphenyl-aldehyde-3
  3-hydroxyphenanthrene-aldehyde-4
  1-3-dihydroxy-2-4-dialdehydebenzene
  2-hydroxy-5-chlorobenzaldehyde
  2-hydroxy-3:5-dibromobenzaldehyde
  2-hydroxy-3-nitrobenzaldehyde
  2-hydroxy-3-cyanobenzaldehyde
  2-hydroxy-3-carboxybenzaldehyde
  4-hydroxypyridine-aldehyde-3
  4-hydroxyquinoline-aldehyde-3
  7-hydroxyquinoline-aldehyde-8
  Formaldehyde
  Glyoxal
  Glyceraldehyde Schiff's bases are prepared with the polyethyleneimines of this invention in a conventional manner such as described in "Synthetic Organic Chemistry," by Wagner & Zook (1953, Wiley), pages 728–9.

Where more extreme conditions are employed, the products may be more complex wherein the carbonyl reactant instead of reacting intramolecularly in the case of a Schiff's base may react intermolecularly so as to act as a bridging means between two or more polyethyleneimine compounds, thus increasing the molecular weight of the polyethyleneimine as schematically shown below in the case where formaldehyde is the carbonyl compound:

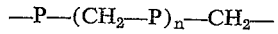

In addition to increasing the molecular weight by means of aldehydes, these compounds result in the formation of cyclic compounds. Probably both molecular weight increase and cyclization occur during the reaction.

The following examples illustrate the reaction of carbonyl compounds with polyethyleneimines. The symbol employed to designate carbonylation is "C," acylation, carbonylation "AC," and alkylation, carbonylation "KC."

*Example 1–C₁*

Charge 900 grams of polyethyleneimine 900 and 900 grams of xylene into a conventional glass resin apparatus fitted with a stirrer, thermometer and side-arm trap. Raise temperature to 90° C. and slowly add 44 grams of acetaldehyde (1 mol). Hold at this temperature for three hours. Vacuum is then applied until all xylene is stripped off. The reaction mass is a thick dark liquid which is soluble in water.

*Example 5–C₁*

Using the same apparatus as above, charge 500 g. (0.1) of polyethyleneimine 5,000. While stirring, add slowly at room temperature 8.2 grams of 37% aqueous formaldehyde (0.1 mol of HCHO). After the reaction has ceased, raise temperature to 100° C. The reaction mass may be stopped at this point. It is a viscous water-soluble material. However, it is possible to continue heating under vacuum until all of the water has been eliminated. Crosslinking occurs with this procedure and care must be taken to prevent insolubilization.

Further examples of this reaction are summarized in the following table:

TABLE IX.—CARBONYLATION

| Example | Mol weight of polyethyleneimine | Aldehyde | Mol ratio aldehyde to polyethyleneimine or deriv. | Temp., ° C. | Time |
|---|---|---|---|---|---|
| 1-C₁ | 900 | Acetaldehyde | 1:1 | 90 | 3 hours. |
| 1-C₂ | 900 | do | 2:1 | 90 | Do. |
| 1-C₃ | 900 | do | 3:1 | 90 | Do. |
| 2-C₁ | 5,000 | Heptaldehyde | 5:1 | 125 | 4 hours. |
| 2-C₂ | 5,000 | do | 3:1 | 125 | Do. |
| 2-C₃ | 5,000 | do | 1:1 | 125 | Do. |
| 3-C₁ | 11,500 | Glyoxal | 2:1 | 80 | 1 hour. |
| 3-C₂ | 11,500 | do | 1:1 | 80 | Do. |
| 3-C₃ | 11,500 | do | 0.5:1 | 80 | Do. |
| 4-C₁ | 20,000 | Salicylaldehyde | 6:1 | 140 | 3 hours. |
| 4-C₂ | 20,000 | do | 5:1 | 140 | Do. |
| 4-C₃ | 20,000 | do | 3:1 | 140 | Do. |
| 5-C₁ | 50,000 | Formaldehyde | 3:1 | (¹) | 1 hour. |
| 5-C₂ | 50,000 | do | 2:1 | (¹) | Do. |
| 5-C₃ | 5,000 | do | 2:1 | (¹) | Do. |
| 6-C₁ | 100,000 | Glyceraldehyde | 6:1 | 125 | 5 hours. |
| 6-C₂ | 100,000 | do | 3:1 | 125 | Do. |
| 6-C₃ | 100,000 | do | 2:1 | 125 | Do. |
| 1-A₇C | 100,000 | Salicylaldehyde | 3:1 | 120 | 2 hours. |
| 2-A₄C | 100,000 | do | 2:1 | 120 | Do. |
| 4-A₃C | 100,000 | do | 1:1 | 120 | Do. |
| 6-A₄C | 100,000 | Benzaldehyde | 3:1 | 110 | 1 hour. |
| 8-A₃C | 100,000 | do | 2:1 | 110 | Do. |

TABLE IX.—Continued

| Example | Aldehyde | Mol ratio aldehyde to polyethyleneimine | Temp., °C. | Time |
|---|---|---|---|---|
| 1-O₁C | Benzaldehyde | 1:1 | 110 | 1 hour. |
| 2-O₁C | Glyoxal | 3:1 | 100 | 2 hours. |
| 3-O₁C | ___do___ | 2:1 | 100 | Do. |
| 19-O₁C | ___do___ | 1:1 | 100 | Do. |
| 20-O₁C | Formaldehyde | 3:1 | (²) | 1 hour. |
| 22-O₅C | ___do___ | 2:1 | (²) | Do. |
| 1-A₅O₁C | ___do___ | 1:1 | (²) | Do. |
| 1-A₅O₅C | Glyceraldehyde | 3:1 | 130 | 4 hours. |
| 6-A₄OC | ___do___ | 2:1 | 130 | Do. |
| 12-O₂AC | Furfuraldehyde | 3:1 | 100 | 1 hour. |
| 17-O₃AC | ___do___ | 2:1 | 100 | Do. |
| 26-O₁AC | ___do___ | 1:1 | 100 | Do. |
| 1-O₂HC | Heptaldehyde | 3:1 | 140 | 6 hours. |
| 1-K₁C | ___do___ | 2:1 | 140 | Do. |
| 5-K₂C | ___do___ | 1:1 | 140 | Do. |
| 1-K₂AC | Formaldehyde | 3:1 | (²) | 1 hour. |
| 5-U₁C | ___do___ | 2:1 | (²) | Do. |
| 3-O₁UC | ___do___ | 1:1 | (²) | Do. |

¹ Start at 25° C., raise to 100° C.
² Start at 25° C., raise to 90° C.

The following table presents specific illustration of compounds other than polyethyleneimine and its derivatives.

TABLE IX-A.—CARBONYLATION

| Example | Molecular weight of polypropyleneimine | Aldehyde | Mol ratio aldehyde to polypropyleneimine | Temp., °C. | Time in hours |
|---|---|---|---|---|---|
| 7-C₁ | 500 | Benzaldehyde | 1:1 | 110 | 1 hour. |
| 7-C₂ | 500 | ___do___ | 2:1 | 110 | Do. |
| 7-C₃ | 500 | ___do___ | 3:1 | 110 | Do. |
| 8-C₁ | 1,000 | Salicylaldehyde | 4:1 | 120 | Do. |
| 8-C₂ | 1,000 | ___do___ | 3:1 | 120 | Do. |
| 8-C₃ | 1,000 | ___do___ | 2:1 | 120 | Do. |
| 9-C₁ | 5,000 | Formaldehyde | 2:1 | 90 | Do. |
| 9-C₂ | 5,000 | ___do___ | 1:1 | 90 | Do. |
| 9-C₃ | 5,000 | ___do___ | 0.5:1 | 90 | Do. |
| 10-C₁ | 10,000 | Glyoxal | 2:1 | 90 | Do. |
| 10-C₂ | 10,000 | ___do___ | 1:1 | 90 | Do. |
| 10-C₃ | 10,000 | ___do___ | 0.5:1 | 90 | Do. |
| 11-C₁ | 20,000 | Acetaldehyde | 3:1 | 100 | 2 hours. |
| 11-C₂ | 20,000 | ___do___ | 2:1 | 100 | Do. |
| 11-C₃ | 20,000 | ___do___ | 1:1 | 100 | Do. |
| 12-C₁ | 40,000 | Heptaldehyde | 4:1 | 130 | 3 hours. |
| 12-C₂ | 40,000 | ___do___ | 3:1 | 130 | Do. |
| 12-C₃ | 40,000 | ___do___ | 2:1 | 130 | Do. |

| Example | Aldehyde | Mol ratio of aldehyde to polypropyleneimine or derivative | Temp., °C. | Time in Hours |
|---|---|---|---|---|
| 15-A₃C | Glyceraldehyde | 3:1 | 125 | 4 |
| 18-A₃C | Heptaldehyde | 2:1 | 125 | 4 |
| 20-A₂C | Furfuraldehyde | 1:1 | 100 | 2 |
| 27-O₁C | Glyoxal | 1:1 | 90 | 1 |
| 28-O₂C | Benzaldehyde | 4:1 | 120 | 2 |
| 29-O₃C | Formaldehyde | 1:1 | (¹) | 1 |
| 43-O₂C | Acetaldehyde | 1:1 | 100 | 2 |
| 15-A₃O₂C | ___do___ | 2:1 | 100 | 2 |
| 20-A₁O₂C | ___do___ | 3:1 | 100 | 3 |
| 32-O₄AC | Salicylaldehyde | 1:1 | 130 | 3 |
| 51-O₄AC | ___do___ | 2:1 | 130 | 3 |
| 32-O₁HC | ___do___ | 3:1 | 130 | 2 |
| 15-A₂O₁HC | Benzaldehyde | 3:1 | 125 | 2 |
| 8-K₄C | ___do___ | 2:1 | 125 | 2 |
| 12-K₂C | ___do___ | 1:1 | 125 | 1 |
| 10-K₄AC | Glyoxal | 2:1 | 100 | 1 |
| 61-O₂KAC | ___do___ | 1:1 | 100 | 1 |
| 20-A₁O₂KAC | ___do___ | 0.5:1 | 100 | 1 |
| 7-U₂C | Formaldehyde | 2:1 | 70 | 1 |
| 12-U₃C | ___do___ | 1:1 | 70 | 1 |

¹ Start at 25° C., raise to 100° C.

The examples presented above are non-limiting examples. It should be clearly understood that various other combinations, order of reactions, reaction ratios, multiplicity of additions, etc., can be employed. Where additional reactive groups are still present on the molecule, the reaction can be repeated with either the original reactant or another reactant.

The type of compound prepared is evident from the letters assigned to the examples. Thus, taking the branched polyamine as the starting material, the following example designations have the following meaning:

| Example designation: | Meaning |
|---|---|
| (1) A | Acylated. |
| (2) AO | Acylated, then oxyalkylated. |
| (3) AOA | Acylated, then oxyalkylated, then acrylated. |
| (4) AOH | Acylated, then oxyalkylated, then heat treated. |
| (5) AX | Salt or quaternary of (1). |
| (6) AOX | Salt or quaternary of (2). |
| (7) AOAX | Salt or quaternary of (3). |
| (8) AOHX | Salt or quaternary of (4). |
| (9) O | Oxyalkylated. |

| Example designation: | Meaning |
|---|---|
| (10) OA | Oxyalkylated, then acylated. |
| (11) OH | Oxyalkylated, then heat treated. |
| (12) K | Alkylated. |
| (13) KX | Salt or quaternary of (12). |
| (14) KA | Alkylated, then acylated. |
| (15) AK | Acylated, then alkylated. |
| (16) AKX | Salt or quaternary of (15). |
| (17) OK | Oxyalkylated, then alkylated. |
| (18) OKX | Salt or quaternary of (17). |
| (19) C | Carbonylated. |
| (20) AC | Acylated, then carbonylated. |
| (21) KC | Alkylated, then carbonylated. |
| (22) CO | Carbonylated, then oxyalkylated. |
| (23) U | Olefinated. |
| (24) AU | Acylated, then olefinated. |
| (25) KU | Alkylated, then olefinated. |
| (26) KUX | Salt or quaternary of (25). |

In addition to polyethyleneimine itself, other polyalkyleneimines can be employed, a typical example of which is polypropyleneimines. Propyleneimine is now commercially available and can be polymerized to the polymer and polypropyleneimine can then be reacted in a manner similar to those reactions shown above. Thus, the teachings contained herein also apply to other polyalkyleneimines besides polyethyleneimine and derivatives thereof.

USE AS A CHELATING AGENT

This phase of the invention relates to the use of the compounds of our invention as chelating agents and to the chelates thus formed.

Chelation is a term applied to designate cyclic structures arising from the combination of metallic atoms with organic or inorganic molecules or ions. Chelates are very important industrially because one of the unusual features of the chelate ring compounds is their unusual stability in which respect they resemble the aromatic rings of organic chemistry. Because of the great affinity of chelating compounds for metals and because of the great stability of the chelates they form, they are very important industrially.

The compositions of this invention are excellent chelating agents. They are particularly suitable for forming chelates of great stability with a wide variety of metals.

Chelating metals comprise magnesium, aluminum, arsenic, antimony, chromium, iron, cobalt, nickel, palladium, and platinum. Particularly preferred of such metals as chelate constituents are iron, nickel, copper and cobalt.

The chelates formed from the compositions of our invention are useful as bactericidal and fungicidal agents, particularly in the case of the copper chelates. In addition the chelates can be employed to stabilize hydrocarbon oils against the deleterious effects of oxidation.

In general, these chelates are prepared by adding a sufficient amount of a metal salt to combine with a compound of this invention. They are prepared by the general method described in detail by Hunter and Marriott in the Journal of the Chemical Society (London), 1937, 2000, which relates to the formation of chelates from metal ions and salicylidene imines.

The following examples are illustrative of the preparation of chelates.

Example 1–$A_7$

An aqueous 0.1 mole solution of the chelating agent of Example 1–$A_7$ is added to an aqueous solution of 0.02 mole cupric acetate. The solution becomes darker in blue color immediately with the formation of the copper chelate. Inability of the solution to plate out copper on a clean and polished iron strip indicates that the copper is effectively removed from solution by the formation of a chelate.

Example 1–$O_2$

An aqueous solution of 0.1 mole of the chelating agent of Example 1–$O_2$ is added to an aqueous solution containing 0.025 mole ferrous sulfate. Lack of the usual formation of a red sediment in the water subsequently due to oxidation and precipitation of iron as hydrated oxide shows the iron had been chelated while in the ferrous form by the reagent 1–$O_2$ and thus effectively removed from further reactions.

Example 1–$A_5O_1$

An aqueous solution of 0.1 mole of the chelating agent 1–$A_5O_1$ is treated with an aqueous solution containing 0.01 mole nickelous acetate. The solution turns to a darker green indicating that a chelate type of material had been formed.

To avoid repetitive detail, chelates are formed from the above copper, iron and nickel salts and the compounds shown in the following table.

Chelating agents:

Polyethyleneimine, molecular wt. 900
Polyethyleneimine, molecular wt. 5,000
Polyethyleneimine, molecular wt. 11,500
Polyethyleneimine, molecular wt. 20,000
Polyethyleneimine, molecular wt. 50,000
Polyethyleneimine, molecular wt. 100,000

| | |
|---|---|
| 1–$A_7$ | 16–$O_4$H |
| 1–$O_2$ | 4–$K_1$ |
| 10–$O_1$ | 5–$K_1$ |
| 16–$O_1$ | 5–$K_3$ |
| 19–$O_1$ | 6–$K_2$ |
| 20–$O_1$ | 20–$O_1$KX |
| 22–$O_5$ | 1–$K_2$A |
| 1–$A_5O_1$ | 1–$O_2$HKA |
| 24–$O_4$A | 6–$U_1$ |
| 1–$O_2$H | |

Polypropyleneimine, molecular wt. 500
Polypropyleneimine, molecular wt. 1,000
Polypropyleneimine, molecular wt. 5,000
Polypropyleneimine, molecular wt. 10,000
Polypropyleneimine, molecular wt. 20,000
Polypropyleneimine, molecular wt. 40,000

| | |
|---|---|
| 15–$A_1$ | 17–$H_3O_2$H |
| 19–$A_2$ | 9–$K_3$ |
| 27–$O_1$ | 12–$K_2$ |
| 39–$O_1$ | 61–$O_2$K |
| 44–$O_2$ | 46–$O_2$HK |
| 47–O | 8–$K_3$A |
| 55–$O_2$ | 7–$K_2$A |
| 15–$A_2O_3$ | 61–$O_2$KA |
| 20–$A_1O_2$ | 8–$U_2$ |
| 28–$O_3$A | 11–$U_3$ |
| 62–$O_2$A | 10–$C_2$ |
| 27–$O_3$H | 15–$A_2O_1$HC |

USE IN TREATING WATER INTRODUCED INTO UNDERGROUND FORMATIONS

This phase of our invention relates to the use of the compositions of this invention in treating water introduced into underground formations, for example, in disposal wells and in the recovery of petroleum from subterranean formations in water flooding operations.

The technique of water flooding to recover oil from depleted oil fields is well known. In general, such process consists in introducing an aqueous medium into one or more injection wells, which penetrate a depleted oil-producing formation, and forcing said medium through the formation towards a production well, which likewise penetrates the formation. In the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water or oil field brine to which has been added various conditioning materials, e.g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial or algae growth, corrosion inhibitors which prevent corrosion of the metallic well equipment and the consequent deposition of corrosion products in the formation, etc. Thus, while the process is usually termed "water flooding" the flooding medium in fact constitutes a rather complex composition containing a variety of conditioning agents. It is not uncommon to include as many as 4 or 5 different agents of various types in the flooding medium. Such use of a plurality of agents, however, adds substantially to the cost of the process and in many instances it is found that such agents interfere with one another.

Many advantages are realized with the use of our compounds in a flooding process in which the flooding medium comprises an aqueous solution of the compounds of this invention. In addition to their surface active properties, these agents have anti-corrosive and strong bactericidal action and do not precipitate alkaline-earth metal salts. Furthermore, these agents display a minimum tendency to become adsorbed on solid surfaces so that when employed in aqueous flooding media, a minimum amount thereof is lost from the solution by adsorption on the matrix of the formation.

In carrying out the present process, the flooding operation is effected in the conventional manner except that the flooding medium comprises an aqueous solution of the compounds of this invention. The concentration of the latter in the flooding medium can be about 500 parts per million or greater and in many cases may be as low as 2 parts per million, depending upon the particular compound employed, the nature of the formation being subjected to flooding, and the degree of bacteria control required. In a typical five-spot flooding operation, oil field brine containing 50 parts per million of the compound is introduced at a rate of about 450 bbls. per day into each of the four input wells under a pressure sufficient to force said solution into the formation and drive it therethrough towards the centrally local output well. The operation can be continued over long periods of time without requiring any substantial increase in the pressure to force the flooding medium through the formation, thus demonstrating that no substantial plugging of the formation occurs either by precipitation of alkaline-earth metal salts or by bacterial growth.

While the flooding media employed in accordance with the present invention comprise only water or oil field brine and one or more of the herein described agents, they may also comprise additional corrosion inhibitors, tracers, supplemental bactericides, and the like. Similarly, they may be employed in conjunction with any of the operating techniques commonly applied to water flooding processes and in conjunction with other secondary recovery methods.

Other modes of applying the principle of our invention may be employed instead of those explained, change being made as regards the methods or materials employed, provided the step or steps stated by any of the following claims, or the equivalent of such stated step or steps, be employed.

In addition the compositions of this invention can also be used in water disposal wells.

This phase of the invention provides a simple and economical method for solving some of the difficult problems heretofore encountered in disposing of unwanted water. In many oil fields large volumes of water are produced and must be disposed of where water flooding operations are not in use or where water flooding operations cannot handle the amount of produced water. Most states have laws restricting pollution of streams and/or land with produced waters and oil producers must then find some method of disposing of the waste produced salt water. In many instances therefore, the salt water is disposed of by injecting the water into permeable low-pressure strata below the fresh water level. The formation into which the water is injected is not the oil producing formation and this type of disposal is defined as salt water disposal or waste water disposal. The problems of plugging of the formation and corrosion of equipment are analogous to those encountered in the secondary recovery operation by water flooding.

The following examples are presented to illustrate the present invention.

*Example*

A brine solution of compound $1-O_1A_1$ in the table listed below is employed in a 5 spot flooding operation in the ratio of 50 p.p.m. in the brine. Compound $1-O_1A_1$ is added to the brine by means of a proportioning pump so that this ratio is obtained. The solution is forced into each injection well at the rate of about 350–400 lbs. per day. The injected water is taken up by the formation at such a rate that little, if any, increase of pressure is required during the week of operation during which the compound is used, thus indicating that little, if any, plugging occurs. The oil pumped from the production well is separated and the water is returned to the storage reservoir where it is used again in a similar manner. This compound also exhibits corrosion protection. The compounds shown in the table exhibit similar results when employed in similar water flooding and in water disposal operations.

COMPOUNDS USED IN TREATING WATER INTRODUCED INTO UNDERGROUND FORMATIONS

Polyethyleneimine:
  Molecular weight—
    900
    5,000
    11,500
    20,000
    50,000
    100,000

| | |
|---|---|
| $1-A_7$ | $10-O_2H$ |
| $3-A_2$ | $2-O_1K$ |
| $7-A^3$ | $3-K_1X$ |
| $1-O_4$ | $6-O_2KX$ |
| $2-O_4$ | $2-A_4KA$ |
| $19-O_2$ | $5-U_2$ |
| $1-A_5O_1$ | $4-O_1U$ |
| $1-O_1A_1$ | $5-C_1$ |
| $16-O_5A$ | |

COMPOUNDS USED IN TREATING WATER INTRODUCED INTO UNDERGROUND FORMATIONS

Polypropylene:
  Molecular weight—
    500
    1,000
    5,000
    10,000
    20,000
    40,000

| | |
|---|---|
| $15-A_3$ | $62-O_2A$ |
| $16-A_3$ | $37-O_1H$ |
| $18-A_1$ | $20-A_1O_2H$ |
| $19-A_3$ | $8-K_2$ |
| $20-A_3$ | $9-K_4$ |
| $27-O_2$ | $12-K_2$ |
| $28-O_2$ | $15-A_2O_4K$ |
| $29-O_1$ | $8-K_3A$ |
| $36-O_4$ | $16-A_3KA$ |
| $37-O_1$ | $7-U_2$ |
| $43-O_3$ | $9-U_3$ |
| $61-O_1$ | $10-C_2$ |
| $15-A_2O_3$ | $15-A_3O_2C$ |
| $20-A_1O_2$ | $12-U_3C$ |
| $28-O_6A$ | |

USE IN INCREASING PRODUCTION OF PETROLEUM OIL FROM SILICEOUS STRATA IN PRIMARY OIL OPERATIONS

This phase of our invention relates to the use of the compounds of our invention in treating sandy or siliceous geological formations or strata penetrated by the surrounding oil well bores or cavities to render such formations preferentially wettable by oil so as to increase the proportion of oil and decrease the proportion of water produced by a given well.

Such alteration in ratio of fluid volumes produced may accomplish any one of a number of specific results which vary with local conditions. In some instances wells can be converted from unproductive wells to productive wells; i.e., strata which would not otherwise justify commercial exploitation can be operated on a sound basis. In some cases treatment of the kind herein contemplated will cause a productive well to yield an even greater output of crude oil, i.e., increase its productivity. Furthermore, not only does such treatment involve a change in the rate at which oil may be produced but also it may yield a greater total output of oil from a particular well, cavity or formation volume, that would be otherwise possible. In other words, such treatment not only affects current rate of production but also the entire volume of oil produced during the life of the well.

Chemical treatment of an oil well of the kind herein described may not only accomplish one or more of the results or objects above mentioned; but also it will reduce current lifting charges due to the fact that a greater amount of water is left behind in the strata when the final depletion stage is reached. Additional objects are obvious; to wit, in many instances objectionable operating conditions, such as corrosion, emulsion formation, etc., may be decreased or eliminated, due to the lesser amount of water produced per barrel of oil.

This phase of our invention relates to the use of the compounds of our invention to impart oil wettability to sandy or siliceous strata and produce the above advantages. In its broadest aspect, the present invention is concerned with the application of the described agents in any suitable or feasible manner.

It is generally recognized that sand is more readily wet by water than by oils. As a result, the encroachment of water into oil-bearing sand formations is greatly favored by the forces of capillary attraction. Such encroachment results finally in the "breaking through" or rising of water into the well bore. Water is then produced along with the oil. In addition, water decreases the production of oil, since its presence in capillary channels blocks the flow of oil which would otherwise occur through these channels. This effect is particularly objectionable when it occurs at the face of the bore hole and in its immediate vicinity as the rate and volume of oil production appears to be highly dependent upon the area of oil permeable formation exposed to the open hole.

In a preferentially water-wettable capillary system, such as is formed by ordinary sand formations, water is strongly held in its displacement by oil is opposed by the force of the interfacial tension at the oil-water interface. The treating process of the present invention changes the sand formation to one preferentially wet by oil with the result that the force of interfacial tension at the oil-water interface then favors the displacement of water by oil in the capillary system, or, conversely, opposes the displacement of oil by water.

In practicing our process, the sand formation is treated by pumping a solution of the reagent into the formation and allowing it to remain sufficiently long for adsorption on the sand grains to occur. The reagent may be put into solution as such or in the form of salt such as the chloride, phosphate, acetate, sulfate, or other salt which is sufficiently soluble in the solvent used. Some compounds of this invention are rather insoluble in water, and, therefore, their salts are used when water is chosen as the solvent. However, in non-aqueous or oil solvents such as alcohols, kerosene, and crude oil, they are often sufficiently soluble to be employed directly.

The reagents used in the present process are effective in very dilute solutions, such as 0.01% by weight or even less and may be employed in such dilution. In many instances, the effectiveness of a solution containing a few hundredths of a percent of a selected agent can be demonstrated readily by immersing an absolutely clean water-wettable silica plate about the size of a microscopic slide in such very dilute solution of the selected compound and agitating gently for a short period of time, for instance, a few minutes to a few hours, and then noting that the silica plate surfaces have been converted from a hydrophile state to a definitely hydrophobe state. However, we prefer to use stronger solutions in order that appreciable amounts of treating reagent may be introduced into the formation without the handling of inconveniently large volumes of solution and without added cost due to labor, shutdown time, etc. The usual concentrations of reagent employed in solution are from 1% to about 25% by weight. In certain instances even more concentrated solutions may be employed.

In the most desirable solutions, we prefer to use, roughly speaking, 10–20% by weight of these compounds. Such solutions also have solvent and emulsifying power for both water and oil, and thus are effective in removing water or oil sheaths surrounding the sand grains of the formation being treated, thereby putting the grains into immediate contact with the treating solution. The solutions which we prefer to employ are characterized by the fact that, in addition to the treating reagent, they contain water, an oil, and an alcohol. It is a remarkable fact that mixtures of this kind can be found which, in the proper proportions, are perfectly clear and homogeneous. The stability of these solutions appears to arise partly from the presence of the actual treating reagents, which, because of their structure, probably act in a manner analogous to ordinary soaps insofar as their solubilizing power is concerned.

The alcohols which can be used in preparing our preferred treating solutions are those containing three or more carbon atoms and less than 30 carbon atoms, and may be either primary, secondary, or tertiary. Those most widely applicable are the primary and secondary aliphatic, alicyclic, mixed aliphatic-alicyclic, and aliphatic ether alcohols containing from four to 10 carbon atoms and including such alcohols as n-butanol, 2-butanol, 2-ethyl hexanol, n-hexanol, cyclohexanol, ethylene glycol monobutyl ether, diethylene glycol monoamyl ether, a terpineol, furfuryl alcohol, oxidized pine oil, rosin oil, and the like. The choice of proper alcohol and its proportion in the mixture depends somewhat upon the treating reagent used, the amount and kind of oil employed, and the proportion of water used and is best determined by preparing experimental mixtures on a small scale. Various representative formulae will subsequently be given.

The oils which can be used in preparing our preferred treating solutions are the liquid, water-insoluble hydrocarbons and chlorinated hydrocarbons, and preferably those which have high solvent power for crude oils. Examples of suitable oils are: kerosene, gasoline, benzol, carbon tetrachloride, dichlorethane, xylene, turpentine, pressure distillate, amylene dichloride, and the like. Crude oil itself may be used in some instances.

As examples of the preferred types of treating solutions to be used in the present process, the following formulae are presented wherein proportions are by weight:

*Treating solution 1*

| | Percent |
|---|---|
| Active compound | 10 to 14 |
| n-Butanol | 18 to 14 |
| Water | 38 to 42 |
| Kerosene | 34 to 30 |

The sand surfaces treated by the present process show a strong affinity for non-polar materials such as oil, asphalt, bitumen, and the like. In some instances, it is advantageous to follow our treating process with a treatment with an asphalt or bitumen solution. When this is done, the sand becomes covered with a uniform adsorbed layer of the asphalt or bitumen which tends to protect the under layer of adsorbed compounds and renders the surface even more water-repellent. However, this after-treatment can often be eliminated and the same effect be obtained by incorporating asphalt or bitumen in the original treating solution. If the original treating solution consists of an oil solution, the asphalt or bitumen is simply dissolved in the oil with the treating reagent. With homogeneous solutions of the kind described in the above examples, the asphalt or bitumen is dissolved in the oil used in preparing the solution, and this is then mixed with the other ingredients. By proper choice of proportions of ingredients, clear, homogeneous mixtures are obtainable. Below is an example of a treating solution incorporating asphalt as one of the constituents:

*Treating solution 2*

| | Percent |
|---|---|
| Active compound | 12 to 13 |
| n-Butanol | 17 to 18 |
| Kerosene | 28 to 22 |
| High melting asphalt | 1 |
| Water | 42 to 46 |

The compounds used in our process are apparently capable of forming association complexes with long chain aliphatic alcohols, which complexes are more soluble in hydrocarbon oils than the original compounds. Solutions containing such long chain alcohols are suitable for treating sand to make it preferentially oil-wettable and in some instances appear to improve the water repellent properties of the adsorbed film. Long chain alcohols can be incorporated in an oil solution of the treating reagent or into solutions of the type previously described, in which case the final treating solution may contain two different alcohols, one of high molecular weight, and one of lower molecular weight, as illustrated by the following:

*Treating solution 3*

| | Percent |
|---|---|
| Active compound | 11 to 10 |
| n-Butanol | 17 to 16 |
| Cetyl alcohol | 9 to 5 |
| Kerosene | 21 to 28 |
| Water | 42 to 41 |

As previously stated, the treating reagents can be employed in the form of simple aqueous or oil solutions. Such solutions lack some of the good features of our preferred solutions such as high solvent and emulsifying power for the well fluids, but because of their cheapness and simplicity of preparation will often be used. Examples of these solutions are as follows:

*Treating solution 4*

| | Percent |
|---|---|
| Active compound | 1 |
| Water | 99 |

*Treating solution 5*

| | |
|---|---|
| Active compound | 1 |
| Benzene | 9 |
| Kerosene | 90 |

*Treating solution 6*

| | |
|---|---|
| Active compound | 1 |
| Denatured alcohol | 9 |
| Water | 90 |

*Example.*—This example illustrates a procedure for carrying out the process of this phase of the present invention on a typical oil well producing from a sand formation and equipped with the usual casing and tubing. If the well is producing water, it is well to determine from what portion of the formation it is coming, as treatment may then be localized to this section with consequent savings in cost of reagent. The main source of water, if any, can often be located by pumping the well from various parts of the open hole which have been separated from the remainder by means of formation packers. After deciding from such tests which portion of the formation is to be treated, the tubing is packed so as to communicate with this section. The treating fluid, Treating Solution 1 above, wherein the active compound is Example 3 of the following table and which contains 14% of 1-$O_2$, 14% of n-butanol, 42% water and 30% kerosene, is then run into the tubing and finally into the formation, pump pressure being applied if necessary to displace it into the sand. In this case pump pressure is required. The amount of solution required will depend upon the amount of open formation being treated but usually will vary from about 4 to about 100 barrels. In this case 25 barrels are employed when all of the solution has been introduced into the tubing, crude oil is then pumped in after it to act as a piston to drive the solution back into the formation. The oil is pumped in slowly so that the treating solution will be in contact with the formation particles for at least a few seconds. Adsorption from the solution occurs very rapidly, however. As more oil is introduced, the treating solution is gradually pushed farther and farther into the formation. Finally all of the solution will have entered the sand and the crude oil will begin to penetrate the treated portions, thus immediately saturating the capillaries with oil which now adheres strongly to the sand surfaces. On being pushed further into the formation, the treating solution eventually becomes spent due to adsorption of the active ingredients and dilution with the formation fluids. The amount of crude oil pumped into the formation behind the treating solution preferably is at least equal the volume of treating solution used and the use of even larger volumes is desirable, since it insures deep penetration of the treating fluid and thorough oil saturation of treated capillaries immediately surrounding the bore hole.

Following treatment, the well is kept shut in for a few hours, after which it is put back in production.

In carrying out our process, it is not necessary to take precautions against the treating solution entering the oil producing portions of the formation, as no plugging precipitates are formed. If desired, the use of a formation packer may be eliminated and the entire formation, both oil and water producing, may be treated. In some instances wells producing no water at all are treated in order to prevent water encroachment.

The following examples are presented to illustrate how the composition of this invention can impart hydrophobic properties to sand normally found in oil areas and thus act in the manner described in the above example.

*Example.*—Sand found in various oil drilling is contacted with various solutions prepared according to Treating Solution 1 wherein the active compound is one or more of those shown in the following table. By such treatment the sand is rendered hydrophobic as contrasted with its previous hydrophilic condition.

COMPOUNDS USED IN INCREASING PRODUCTION OF PETROLEUM OIL FROM SILICEOUS STRATA IN PRIMARY OIL OPERATIONS

| | |
|---|---|
| 11-$A_3$ | 6-$A_4$K |
| 2-$O_2$ | 6-$K_2$X |
| 19-$O_3$ | 11-$O_1$HKX |
| 22-$O_2$ | 2-$A_4$KA |
| 1-$A_5O_1$ | 5-$U_3$ |
| 4-$A_2$O | 2-$O_1$KAU |
| 1-$O_3$A | 5-$C_3$ |
| 11-$O_1$H | 1-$O_2$HC |

COMPOUNDS USED IN INCREASING PRODUCTION OF PETROLEUM OIL FROM SILICEOUS STRATA IN PRIMARY OIL OPERATIONS

Polypropyleneimine:
  Molecular wt.—
    500
    1,000
    5,000
    10,000
    20,000
    40,000

| | |
|---|---|
| 16–$A_1$ | 15–$A_2O_3$ |
| 16–$A_3$ | 18–$A_3O_1$ |
| 18–$A_1$ | 44–$O_5A$ |
| 19–$A_3$ | 32–$O_1H$ |
| 27–$O_4$ | 20–$A_1O_3H$ |
| 28–$O_3$ | 8–$K_2$ |
| 29–$O_1$ | 15–$A_2K$ |
| 31–$O_1$ | 15–$A_2O_4K$ |
| 43–$O_2$ | 51–$O_4AK$ |
| 54–$O_2$ | 8–$K_3A$ |
| 55–$O_4$ | 46–$O_3HKA$ |
| 58–$O_3$ | 7–$U_3$ |
| 59–$O_2$ | 10–$U_2$ |
| 61–$O_2$ | 9–$C_3$ |
| 62–$O_1$ | 20–$A_1O_2C$ |

REMOVING MUD SHEATHS FROM OIL WELLS

This phase of our invention relates to the use of the compositions of our invention to remove from a well or from an oil- or gas-bearing formation penetrated by a well, a substantially impervious, mud-like sheathing or coating, resulting from the use of drilling fluids in the drilling operation or resulting from the presence in the hole, at some other time, of fluids capable of producing such sheaths. Such use increases the productivity of a well by providing a novel procedure for removing from the face of the producing formation various solids, such as natural clays, deposited thereon during drilling or subsequently. It makes possible the recovery of oil or other fluids from relatively shallow formations which were penetrated during the drilling to greater depths and which were "mudded-off" by deposition of solids from the drilling fluid.

By the term "mudded-off formaton" we mean a formation or stratum, the walls of which have been more or less effectively sealed by an impervious sheath of solids derived from the drilling fluid. Naturally-occurring clays are commonly used to prepare drilling fluids. In some cases, wells "make their own mud," the formations encountered containing clay of such properties that it is unnecessary to import the ingredients for preparing the drilling fluids. Where natural clays are found deficient in one or more properties, they may be conditioned to improve their specific gravity characteristics, their viscosity, or their gel forming propensities by the addition of other materials. For example, weighting materials, such as barite or hematite, may be added; or bentonite may be used to improve the viscosity and gel-forming characteristics. In rarer cases, the drilling fluid may be prepared entirely from a weighting material such as barite, and a stabilizer, such as bentonite, in the total absence of naturally-occurring clays or "muds." In this description we shall use the term "mud" to include drilling fluids of any and all of the foregoing types and the term is to be construed to apply to all of them with equal force.

The deleterious effects of drilling muds are of several kinds, the principal one being the deposition of mud sheaths on the face of the formation penetrated. While this deposition of a mud sheath is desirable in the upper portions of the hole, it is extremely undesirable when the producing horizon has been reached. It is also undesirable in the upper strata or portions of the hole when and if it later becomes necessary or desirable to test the productivity of such upper strata.

The problem thereby presented exists in wells drilled into high-pressure formations, as well as in wells penetrating low-pressure areas, and in partially or entirely depleted formations. In semi-depleted fields, where formation pressures have declined to small values, the problem is most serious. There are numerous instances on record where, although wells have been drilled into proven producing horizons, no oil can be commercially produced at present; and where, unless some means is found to remove the sheaths, large reserves of oil will be lost.

Various mechanical means have been employed to remove the sheaths, with only partial success. Washing with water has been attempted, in many cases unsuccessfully. In the case of some oil wells previously washed unsuccessfully with water, application of our process has resulted in the removal of a large amount of mud, usually with very gratifying consequences as to increased productivity.

The process which constitutes this phase of the present invention may be practiced in various ways, and may be applied at various times in the life of a well. It may be applied immediately upon completion of the well, or even prior to completion. It may be used on wells during or upon depletion. It may be used on wells which, upon depletion of a lower formation, or upon the discovery that such deeper formation is unproductive, have been plugged back to higher formations previously disregarded in drilling and which may now be required to be explored. It may be used on wells which, because of the presence of such mud sheaths, have never been productive. Our process in also applicable to those cases where the sheaths result from mud introduced into a well subsequent to drilling, e.g., for the purpose of killing the well. It is also applicable to those comparatively rare cases were mud sheaths are deposited during cable-tool drilling.

In some instances, the mud used in drilling or reworking a well infiltrates to a greater or lesser depth into the natural formation where it sets up a barrier to productivity. The present process is applicable to the removal of mud solids occurring as such infiltrated mud sheaths or barriers.

The process constituting this phase of the present invention is not to be confused with any process designed to remove clogging deposits of wax, asphaltic materials, paraffin or the like from wells, or to prevent their deposition. Such deposits of organic materials constitute a recurring problem. On the contrary, once a mud sheath has been removed by means of the present process, it can seldom again constitute a problem in that well.

Our process includes the application of a compound of the kind described to a mud sheath, however produced, which exists in a well, e.g., on the walls of an oil-bearing formation, in such a manner that the relatively impervious sheath is removed and the well is rendered productive or the existing productivity thereof is increased.

In practice, the compounds of the present invention are dissolved in a suitable solvent, for example, water or a water-insoluble organic liquid which is capable of acting as an oil solvent. Depending on the choice of compound, the solubility may be expected to range from ready water-solubility in the free state to water-dispersibility. The salts, and specifically the acetates, generally show improved water-solubility; and we have obtained good results by using salt forms which possess appreciable water-solubility. One of the most common of the oil solvents is the aromatic fraction of petroleum distillates, which is quite generally found to disperse these compounds. Another is the fraction removed from distillates by application of the Edeleanu liquid sulfur dioxide extraction process, and which comprises aromatic and unsaturated compounds. In some cases, stove oil or similar petroleum distillate is usable. Oil solvents like carbon tetrachloride or carbon disulfide are usable, although their comparatively high cost militates against their use. Amylene dichloride is sometimes a desirable material for the present purpose, as are tetrachloromethane, tetraline, trichloroethylene, benzol and its homologues, cyclohexane, etc. This component of our reagent must be water-insoluble and must be an oil solvent. Otherwise, its selection is not limited, although it should be compatible with the other ingredient of our reagent. Naturally, its cost and availability will influence the selection. We prefer to use aromatic petroleum solvent since it is widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice, and the character of the mud used in drilling the well can also be important. The choice will frequently depend upon relative cost of solvents.

A mixture of organic liquids having the specific property of dissolving petroleum oil is very effective. One such mixture which we have employed contains benzol, toluol, carbon tetrachloride, tetralin and kerosene. These solvents are exactly those disclosed in Patent No. 2,153,589. The proportions of these solvents recited in said earlier patent are equally satisfactory for use in preparing the present reagents. Such proportions recited in said patent are: benzol, 35 lbs.; toluol, 15 lbs.; carbon tetrachloride, 16 lbs.; tetraline, 40 lbs.; and kerosene, 8 lbs.

To prepare our reagents, one simply mixes the two components (i.e., compounds of the present invention plus a suitable solvent) together in suitable proportions. The optimum proportion of each will vary depending upon its properties; but in general, the resulting mixture should be homogeneous.

Where an organic solvent is employed, the finished solution should produce a relatively stable aqueous dispersion in water. In cases where the two ingredients form thoroughly homogeneous mixtures, which, however, are not water-dispersible, transformation of the compounds of this invention into the salt form will sometimes render the solution water-dispersible. In such cases we have preferably employed acetic acid to effect the neutralization.

The reagents are preferably employed in the form of an aqueous dispersion or solution, although sometimes favorable results are obtained merely by introducing the undiluted compound or the compound dissolved in an organic solvent into the well whose productivity is to be improved. In some of such cases, undoubtedly, there is produced in the well bore, or in the formation, an aqueous dispersion of the reagent in water present in such bore or such formation. Production of an aqueous dispersion from the organic solution and water is accomplished almost spontaneously on mixing the two, in most cases. We greatly prefer to employ the reagents in the form of an aqueous dispersion because in that manner the two components are prevented from separating from each other before the reagent can become effective to remove the mud sheaths.

It is also noteworthy that our present reagents are useful in the presence of acids. They can therefore be applied satisfactorily to wells that have been acidized by the use of hydrochloric or hydrofluoric or other acid. The reagents of Patent 2,153,589, above-mentioned, would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the mud sheath and the supporting wall. Also it penetrates the formation to a considerable distance and facilitates the return of drilling water to the hole.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound per 9 parts of oil solvent. We have determined that the proportion of active compound and oil solvent can advantageously vary within the range of 9:1 and 1:9.

As a preferred example of reagent we employ a 20 weight percent dispersion of active compound in an aromatic petroleum solvent and include 2% of concentrated acetic acid in the finished reagent where the salt formed is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form. Thus the amount of active compound present in the treating reagent can range from 1 to 100%, but preferably 5 to 25% by weight based on the weight of treating reagent.

From the foregoing, it will be understood that this phase of our invention includes subjecting a mud sheath of the kind mentioned to the action of a reagent of the kind described. Merely injecting such reagent into a well which has been mudded-off sometimes results in the more or less complete removal of the sheath. Agitating the reagent in the well after it has been injected therein usually produces more favorable results, however. Any of the various methods available for agitating a fluid in the hole, such as swabbing or use of perforation washers, can be applied during the injection of the reagent or before or after the period during which the reagent is allowed to stand quiescent in the well. Agitating the fluid after allowing the reagent to stand in the well for a period of time in order to penetrate and soften the sheaths produces very favorable results. If a perforation washer is employed to agitate the fluid, it may be desirable to "spot" therewith, i.e., inject at various levels, additional quantities of the reagent before agitating.

Our preferred method of cleaning an oil well of mud sheaths is as follows: Remove any debris present in the bottom of the hole, for example, by bailing. Then replace the head of oil standing in the well as completely as possible with a 5 weight percent aqueous solution or dispersion of the reagent. Allow the solution or dispersion to stand in the hole of a suitable period of time. (We have found that a period of standing ranging from 8 to 24 hours produces acceptable results.) Then introduce an additional quantity of solution or dispersion into the well and immediately thereafter agitate the fluid in the well by swabbing or operating a perforation washer therein. After agitating the dispersion in the hole by any desired means, and so scrubbing or washing the sheath from the formation walls (swabbing or other means may be employed if required or desired) to bring additional quantities of mud into the hole, the debris dislodged by the use of our reagent is removed with a bailer or in any other desired manner. The well is preferably not put on the pump until no further amounts, or only small amounts, of mud are being recovered.

The above-recited procedure for operating this process is exemplary only. The procedure may be varied as conditions may require. In all cases, however, it consists broadly in the application of our reagent to the mud shaths; and, of course, subsequently removing from the well the debris accumulated in the well as the result of such application.

It will be obvious that our process is applicable to the removal of any mud sheath present on the perforated pipe in the well in addition to that present on the walls of the formation. However, we consider the removal of the sheath from the formation wall the more important function of our process.

The following is presented to illustrate our invention:

*Example.*—A freshly drilled well whose oil flow is slow due to the formation of a mud sheath is treated by the preferred method described above with a 5 weight percent aqueous solution of compound $7\text{-}A_2$ of the following table for a period of 10 hours. Agitation of the solution is effected by the operation of a perforated washer. The debris dislodged is removed by means of a bailer. After all debris is removed, the well is put on the pump again.

To show the effect of these compounds on mud sheaths, large sections of hardened mud sheaths are removed from actual oil wells and treated with a 5 weight percent aqueous solution or dispersion of the compounds shown in the following table. After standing overnight, the mud sheaths are easily broken into a fine dispersion.

COMPOUNDS USED IN REMOVING MUD SHEATHS FROM OIL WELLS

| | |
|---|---|
| $1\text{-}A_6$ | $25\text{-}O_3A_2$ |
| $5\text{-}A_2$ | $14\text{-}O_1H$ |
| $7\text{-}A_2$ | $6\text{-}K_2$ |
| $2\text{-}O_6$ | $19\text{-}O_2K$ |
| $3\text{-}O_2$ | $6\text{-}K_3X$ |
| $11\text{-}O_4$ | $19\text{-}O_4KX$ |
| $16\text{-}O_5$ | $5\text{-}K_4A$ |
| $20\text{-}O_4$ | $5\text{-}U_1$ |
| $2\text{-}A_4O$ | $24\text{-}O_1U$ |
| $14\text{-}O_6A$ | $2\text{-}C_1$ |

COMPOUNDS USED IN REMOVING MUD SHEATHS FROM OIL WELLS

Polypropyleneimine, molecular wt. 5,000

| | |
|---|---|
| $18\text{-}A_1$ | $58\text{-}O_2H$ |
| $36\text{-}O_4$ | $20\text{-}A_1O_3H$ |
| $45\text{-}O_4$ | $9\text{-}K_3$ |
| $47\text{-}O$ | $19\text{-}A_3O_1K$ |
| $15\text{-}A_2O_3$ | $20\text{-}A_1KA$ |
| $18\text{-}A_3O_3$ | $11\text{-}U_2$ |
| $20\text{-}A_1O_3$ | $11\text{-}C_2$ |
| $45\text{-}O_1A$ | $8\text{-}K_4C$ |

USE IN FRACTURING OIL WELLS

This phase of the invention relates to the use of the composition of our invention in wells, especially those drilled for oil or gas, to facilitate the flow of fluids in an earth formation penetrated by the bore of a well by the injection into the formation through the well bore of liquids carrying in suspension particulated solids.

Among the methods in current use for facilitating flow of fluid either into or out of earth formations penetrated by the bore of a well are those involving liquid injection into the earth through the well bore at hydrostatic pressures great enough to form channels or passageways by fracturing or parting the earth formations into which the liquid is injected. In such injections, the pressures used are oftentimes greater than those required to lift the overburden of earth and at least great enough to exceed the bonding strength of the formations encountered. While it is apparent that fractures or cracks may be formed in oil- or gas-bearing formations by the hydraulic action described, as a result of which the facility with which oil or gas flows to the well may be increased, the difficulty may arise that on releasing the pressure on the injected liquid used to create the fractures or cracks these tend to close due to the weight of the overburden. As a consequence, it is generally the practice during fracturing to convey into the earth a particulated hard solid material, such as sand in suspension in the fracturing medium. The particulated solids on being carried into the fractures or cracks formed by the high pressure hydraulic action described, act as props and hold open the fractures and cracks after the injection pressure is released. But certain disadvantages inure to this practice which limits its usefulness. Among these are that the particulated solids comprising the propping agent do not remain suspended in the liquid media conventionally used to convey the solids into the earth formation. These media are hydrocarbon liquids, such as gasoline, kerosene, crude oil, and the like, generally rendered more viscous by dissolving therein a thickening agent, such as soap. As a consequence of the tendency for the particulated solids to settle in all such conveying media, special mixing facilities must be provided at the well site to mix, and maintain in suspension, the particulated solids in the conveying medium while making the injection into the well. The thickened or viscous oils oftentimes conventionally used have the added disadvantage that they are difficult to pump through the well tubing and do not return from the earth formation after their injection so that an especial treatment of the earth formation is required to purge it of the injected liquid. Still another disadvantage is that, if, during an injection into the well of the conventional mixture of conveying liquid and particulated solid, it should become necessary to stop the injection, settling out of the propping agent occurs in the injection pump and piping connecting the pump with the well and in the well bore or well tubing, if such be used, making it difficult, if not impossible, to restart the injection operation.

The compositions of our invention are excellent emulsifiers in these systems and so provide an improved method of treating earth formation penetrated by the bore of a well, so as to facilitate flow of fluid into or out of the earth formation, involving the conveying of particulated solids, e.g., sand, through the well into the earth formation, whereby the foregoing disadvantages are overcome.

This phase of the invention is predicated upon forming a pumpable fluid emulsion, comprising immiscible liquids, mixing therewith a suitable particulated solid material, and then injecting the resulting mixture into the earth formation through the well. The particles of the solid material or propping agent are entrained in the emulsion at the interface between the particles of the liquid phases of the emulsion and thereby are held in substantially permanent suspension without the need for continuous agitation during injection. The emulsion mixture is easily pumped and either readily penetrates permeable earth formation or can be forced into the earth by the application of sufficient pressure. On passing into the earth formation, the emulsion spontaneously breaks thereby releasing the particles of propping agent which become lodged in the fractures or cracks of the formation into which the injection is made. The solid particles so deposited form permeable masses which hold apart the walls of the fractures, permit the return to the well hole of the emulsion liquids without returning the solid particles when the injection pressure is released, and facilitate oil flow either out of or into the formation.

In carrying out the invention at least two immiscible liquids are emulsified together in the presence of a suitable emulsifying agent, that is, one such that the emulsion obtained is capable of being injected into the interstices of an earth formation under moderate pressure and of spontaneously therein breaking. In this way, relatively low pumping pressures suffice to make the injection, and, deposition in the earth formation of the particulated solids carried into the formation by the emulsion is assured when the emulsion breaks. Suitable emulsions are obtained when one of the immiscible liquids involved constitutes the major portion of the emulsion. Proportions of near equal parts of each immiscible liquid are generally to be avoided. In other words, one of the liquids, exclusive of the emulsifying agent, should constitute substantially more than half of the emulsion, e.g., from about 55 to 98.5 percent by volume of preferably from about 66 to 97 percent of the emulsion.

For reasons of cheapness and availability, one of the liquids is preferably aqueous and may be any ground water either potable, saline, alkaline or acid, the purity of the water used apparently not being critical. A wide variety of liquids which are immiscible with the aqueous liquids are available. For example, there may be used petroleum oil, such as crude oil, petroleum fractions, such as refined oil, kerosene, gasoline, diesel oil, fuel oil, and the like, or other water immiscible hydrocarbon liquid, such as benzene, xylene, toluene, and the like.

If, in employing an aqueous liquid, it be acidified, the further advantage is realized of dissolving acid-soluble material in the earth formation and producing pore enlargement as a result. In addition, there is obtained a quick demulsification of the emulsion as its acid component becomes neutralized in the earth formation, thereby allowing the well to be put into production as soon after the injection as the necessary changes in piping at the well head can be arranged. For example, in an emulsion of dilute hydrochloric acid in oil containing an admixture of 1.5 pounds of 20 to 40 mesh Ottawa sand per gallon, the sand does not noticeably settle in an hour but by contacting the mixture of the emulsion and sand with either earth formation material containing acid-soluble matter or fine sand the emulsion loses its ability to keep the Ottawa sand in suspension and the Ottawa sand settles at the rate of at least 2000 inches per hour. In formulating emulsions using an acidified aqueous solution as one of the immiscible liquids, ordinary aqueous hydrochloric acid may be used such as that containing from about 2 to 25 percent of HCl by weight, although other concentrations may be used. A preferred concentration of the HCl is about 15 percent.

In making the emulsion, the emulsifier is preferably first mixed with the liquid in which it most readily disperses or dissolves, this liquid being the one which usually constitutes less than half of the volume of the emulsion. Emulsification of the liquids is effected in any of the ways known in the art of making emulsions. A generally satisfactory method is to stir together vigorously the liquids to be emulsified in the presence of an emulsifying agent, and, at the same time recirculate the resulting mixture. Recirculation may be accomplished by withdrawing the stirred mixture from the mixing zone and pumping it back by means of a force pump through a small orifice, e.g., one having an opening 3/16 inch in diameter.

The emulsion produced in our process possesses sufficient stability to remain unbroken for considerable periods of time and in some instances at moderately elevated temperatures, such as those encountered in deep wells. It is desirable for the emulsion to remain unbroken for as long as 30 minutes more or less, for example, and preferably longer in some cases to allow adequate time both for mixing the particulated solid material with the emulsion and for making the injection of the resulting slurry into the earth formation. The emulsion is also capable of being injected into the earth formation and spontaneously breaking on passing into the interstices of the earth formation as aforesaid. The amount of emulsifying agent required may be ascertained by trial and usually ranges from about 0.5 to 12 percent of the combined weight of the liquids to be emulsified.

Preferably as soon as the emulsion is made and the well is ready for treatment, the desired particulated solid material to be conveyed into the earth formation through the well is mixed with the emulsion in suitable proportions in any convenient manner to form a pumpable slurry. The proportions do not appear to be sharply critical and may range, for example, from about 0.5 to 6 pounds per gallon of emulsion. Various solid materials in particulate form may be used which are insoluble in the emulsion as for example, ceramic materials, metals, and rocks. Sand, because of its hardness, cheapness and general availability, is preferred. The particle sizes may vary over a considerable range. The particles should be small enough to pass into the cracks or fractures existing in the formation or produced during the injection treatment but not so small as to exhibit a low fluid permeability when deposited within the earth formation. In general, particle sizes between these extremes are to be used. Generally useful sizes of particles are those which will pass through a No. 20 standard sieve while being retained upon a No. 40 standard sieve. Other sizes may be used such as those between a No. 4 and a No. 120 standard sieve.

In order to assist in delivering the slurry to the particular formation to be treated, a packer may be placed in the well hole or casing, as the case may be, at a suitable depth. The packing means may be either the single or dual variety and set in the well by means of a string of tubing, as understood in the art. In this way, the treating materials to be injected are confined in the well hole adjacent to the formation to be treated and there may be put under sufficient pressure to cause them to enter the formation.

Passage of the slurry, that is, the mixture of particulated solid material and the emulsion, into the earth may be preceded by an injection of a breakdown liquid such as crude oil or other available liquid or by an injection of the emulsion without the particulated solid. The injection of the breakdown liquid is made at rates comparable to those to be employed in injecting the slurry such as 1/2 to 5 barrels per minute or more depending upon the capacity of the pumping equipment and the pressures encountered which should not be allowed to exceed the safe working pressures of the well equipment.

During the breakdown injection, the pressure in the well rises, reaches a maximum, and then declines, thereby indicating that rupturing or fracturing of the earth formation or removal of fluid blocks in the interstices of the earth formation has occurred. In any event, irrespective of the explanation of the causes of the pressure changes during such an injection, the injection of breakdown liquid serves to insure passage into the formation of the slurry subsequently injected. In some instances, the breakdown of the formation before injecting the slurry may be omitted. In such instances, it is usual for the injection pressure to pass through a maximum as in the case of the injection of a breakdown liquid. Omission of the injection of the breakdown liquid ahead of the slurry is not advisable where there is the possibility of the particulated solid becoming separated from the emulsion at the face of the formation as by filtration. It has been found that by preceding the slurry injection with an injection of oil or other breakdown liquid, as aforesaid, at rates producing a breakdown of the formation as evidenced by a change from a rising to a declining pressure occurring during the injection (without substantially changing the injection rate) the risk of the particulated solid material filtering out of the slurry at the face of the formation is reduced, if not eliminated.

The volume of breakdown liquid and of slurry to use varies widely with different earth formations and is best determined by experience using as a guide at least the amount required to produce a breakdown pressure at nominal injection rates. For example, it is a common experience in making such injections, say at about 2.5 barrels per minute, to observe a rise in the injection pressure during the initial stages of the injection and to observe a leveling off in pressure after 3 to 20 barrels of liquid has been injected. The leveling off in pressure is usually followed by a more or less sudden decline in pressure as though a break-through of the passage of liquid into the formation has taken place which permits a higher injection rate without a pressure increase.

After a breakdown of the formation is obtained, the slurry may be injected readily in an amount which is preferably at least as large as, if not larger than, the volume of liquid required to reach a breakdown pressure. For example, volumes of slurry of from 1000 to 30,000 gallons have been used effectively. It is to be understood however that the injection of the slurry sometimes can be made without attaining a breakdown pressure either before or during the slurry injection. Nevertheless injection is facilitated by introducing slurry-free liquid into the well ahead of the slurry as aforesaid.

Where it is desirable to avoid freezing of the emulsion formed with water as one of the immiscible liquids, there may be added to the water a water-soluble alcohol, e.g., ethyl alcohol, in amount sufficient to lower the freezing point of the water to the desired extent. Temperatures as low as $-40°$ F. may be withstood when sufficient alcohol is used.

Among the advantages of the process are that particulated solid materials, e.g., sand, are readily conveyed in an emulsion as pumpable slurry through either the well casing, tubing string, or open well bore into the desired formation; the injection of the slurry is not seriously impeded by the emulsions as these readily enter fluid permeable earth, particularly when preceded by an injection of oil or other breakdown liquid; the particulated solids are rapidly released from suspension in the conveying media as these lose their emulsified condition in the interstices of the earth formation; because the particulated solids are released from the conveying medium as the slurry permeates the earth formation no further treatment of the earth formation is required following the injection of the slurry and time is saved in putting the well back into production and obtaining pipe line oil.

The following examples are presented as illustrative of the practice of this invention:

*Example.*—About 100 pounds of compound $10-A_1O_2$ (shown in the following table) are dissolved in about 140 gallons of kerosene, thereby making a solution which is to become the external phase of a water-in-oil type of emulsion. To the mixture so-obtained is added about 350 gallons of 5 percent aqueous hydrochloric acid solution and the resulting mixture is stirred until a thick creamy emulsion is obtained. 400 pounds of sand is then stirred into the emulsion, thereby producing an emulsion-sand slurry which is then ready for injection into an oil well as in treating producing formations. The injection of the slurry is preceded by an injection of oil to breakdown the formation. A chaser of oil is used to displace the slurry from the well into the well's productive formation. After the injection of the slurry into the well's productive formation, the emulsion breaks thereby depositing the sand from the emulsion in passages in the producing formation. Following the injection, the well is swabbed. The sand remains behind while oil flows freely from the formation into the well.

Suitable fracturing emulsions are also prepared in this manner from the compounds listed below.

COMPOUNDS USED IN FRACTURING OIL WELLS

| | |
|---|---|
| $1-A_7$ | $5-K_1$ |
| $3-A_4$ | $12-A_2K$ |
| $13-A_3$ | $5-K_3X$ |
| $1-O_4$ | $23-O_4KX$ |
| $19-O_4$ | $1-O_2HKA$ |
| $20-O_3$ | $6-U_3$ |
| $10-A_1O_2$ | $23-O_2AU$ |
| $17-O_3A$ | $5-C_3$ |
| $20-O_1H$ | $1-O_2HC$ |

COMPOUNDS USED IN FRACTURING OIL WELLS

Polypropyleneimine, molecular wt. 40,000

| | |
|---|---|
| $19-A_3$ | $61-O_2K$ |
| $54-O_5$ | $61-O_2KA$ |
| $58-O_4$ | $10-U_2$ |
| $20-A_1O_3$ | $11-U_3$ |
| $62-O_2A$ | $12-U_1$ |
| $58-O_2H$ | $11-C_2$ |
| $11-K_4$ | $12-K_2C$ |

USE IN A PARAFFIN SOLVENT

This phase of this invention relates to the use of the compositions of this invention in a process for preventing and removing accumulations of solid matter from oil wells and pipe lines, and thereby improving their productivity and capacity.

In many oil wells, deposits of paraffin, wax, asphaltic and bituminous organic solids, and similar materials accumulate in objectionable quantities on the face of the producing formation, on the screen or liner, or in the pump, the casing or the tubing of the well. Such deposits operate to decrease materially the productivity of the wells in which they occur. Similarly, deposits of the same character are found in some oil flow lines and oil pipe lines where they effectively reduce the capacity of the pipes, sometimes to the point where little or no fluid can be passed through such conduits in the normal manner of operation.

The accumulations with which this phase of the invention is concerned are to be distinguished at the outset from accumulations of mud solids in the form of mud sheaths. The present deposits quite naturally and frequently contain minor proportions of inorganic materials like sand or shale fragments from the productive formation, or minor proportions of residual drilling mud solids of the character of clay or weighting materials. They are, however, essentially organic in character; whereas, drilling mud solids are essentially inorganic in nature.

Further to distinguish the two types of deposits and the character of the respective problems they present, it should be noted that mud solids are ordinarily deposited in a well, or in or on a geological formation penetrated by a well, as a result of the drilling operation or some subsequent servicing operation, like "killing" the well with mud. Such man-produced mud deposits or mud sheaths constitute non-recurring deposits. Once such a deposit or sheath has been removed, it seldom again appears or occurs in that well.

On the contrary, the organic deposits, with the removal of which this present process is concerned, are essentially progressive deposits produced naturally during the operation of the well and its accessories. Whereas the mud sheaths occur only at the geological formations penetrated during drilling of the well, the present organic deposits deposits may occur at or in the formation, at various levels in the well itself, or at various points in the transportation lines reaching from the well to the refinery, including tanks. Their deposition is progressive; or, if they are removed periodically, they may be said to be recurring. Such removal is usually only intentionally achieved; but in some instances, such organic deposits "slough off" their supporting metallic structure. In such instances they give the appearance of being recurring because continuing deposition soon produces a new accumulation of appreciable and detectable proportions.

Although such organic deposits may at times contain minor proportions of inorganic materials like sand, such inorganic components are not material to the deposition of the organic accumulations, their essential characteristics, or their removal by the process constituting this phase of our invention. In a sense, the minor inorganic constituents are the result of entrapments by the waxy, sticky, or gummy organic material constituting the bulk of the ultimate deposit.

The purpose of removing such deposits is obvious. In some areas wells decline in productivity, at a more or less rapid rate, because of deposition of such deposits on the face of the producing formation. In some cases, the decline is sufficiently rapid that the wells must be serviced in some manner or other at a frequency ranging from several days to several weeks. In some instances, the deposition is so slow that servicing at long intervals is sufficient to maintain the well at a satisfactory level of productivity. The same is true of the various conduits through which the oil travels from the well to the refinery; and periodic servicing of such elements is also required. The capacity of a conduit of circular cross-section is reduced greatly by such deposits, usually well beyond the reduction expected from the ratio of effective cross-sectional areas of the clean conduit and the fouled conduit. Where organic deposits of the present type occur on formation walls, well productivity may fall substantially to zero, especially in low-pressure fields. Pipe capacities are frequently reduced to a small fraction of their capacities when clean. Ultimately, of course, such pipes may be found completely clogged by such deposits. In the case of pipe lines, the operator may find himself burdened with the cost of a 6" or 8" line, yet benefiting from a capacity equal to that of a 3" or 4" line.

The process which constitutes this phase of the present invention consists in subjecting such clogging organic deposits of wax, paraffin, asphaltic or bituminous substances and the like, to the action of the compounds of this invention, to the end that such deposits are removed from the surfaces to which they were originally adherent. By means of the process, the productivity of wells is restored as is the capacity of flow lines, pipe lines, traps, tanks, pumps, and other equipment, through which such oil travels from formation to refinery.

It will be obvious that if the first minute deposit of such organic materials is subjected to our reagent, and if such application of reagent is practiced continuously or periodically with sufficient frequency, the operation has the appearance of a preventive process rather than a corrective process. In addition, it should be noted that our reagent has a bore real claim to acting as a preventive, in that surfaces effectively cleaned by its application tend to resist renewed deposition of such materials, and to remain clean and operative for longer periods than if the reagent had not been applied. Therefore, we have characterized our process as being both a preventive and a corrective one. It may obviously be applied in either sense and achieve the same ultimate goal, the improvement of efficiency of operation of wells and equipment. In the appended claims, we have used the word "removing." It should be clearly understood that we thereby include the prevention of organic deposits of the present kind.

The reagent which we employ in practicing our process consists of the compounds of our invention generally used in combination with one or more water-insoluble organic liquids capable of acting as an oil solvent.

We prefer to employ our reagent in the form of a relatively stable aqueous dispersion. By "relatively stable aqueous dispersion" we mean one that is not resolved into its components spontaneously, on standing for protracted periods of time, e.g., for more than one hour. However, it may be employed in undiluted form or dispersed in oil. In general we have found the aqueous dispersions to be somewhat more effective. Sometimes such aqueous dispersions will be effective, whereas the undiluted reagent or its non-aqueous dispersion or solution be substantially ineffective.

Depending upon the choice of compound and its molecular weight, the solubility may be expected to range from ready water-solubility in the free state substantially to water-insolubility. The salts, and specifically the acetates, generally show improved water-solubility over the simple compound; and we have obtained the best results by using salt forms which possess appreciable water-solubility.

The other component of our reagent is a water-insoluble organic liquid which is capable of acting as an oil solvent. Many materials lend themselves to this use. One of the most common is the aromatic fraction of petroleum distillates. Another is the fraction removed from distillates by application of the Edeleanu liquid sulfur dioxide extraction process, and which comprises aromatic and unsaturated compounds. In some cases, stove oil or similar petroleum distillate is usable. Solvents like carbon tetrachloride or carbon disulfide are usable, although their comparatively high cost millitates against their use. Amylene dichloride is sometimes a desirable material for the present purpose, as are tetrachloroethane, tetralin, trichloroethylene, benzol and its homologues, cyclohexane, etc. This component of our reagent must be water-insoluble and must be an oil solvent. Otherwise, its selection is not limited although it should be compatible with the other ingredient of our reagent. Naturally, its cost and availability will influence the selection. We prefer to use an aromatic petroleum solvent since it is a widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice. The choice will frequently depend on relative cost of solvents. We have found that a mixture of organic liquids having the specific property of dissolving petroleum oil is very effective. One such mixture which we have employed contains benzol, toluol, carbon tetrachloride, carbon disulfide, tetralin and kerosene.

To prepare our reagents, one simply mixes the two components together in suitable proportions. The optimum proportion of each will vary, depending upon its properties; but in general, the resulting mixture should be homogeneous.

We also prefer that the finished reagent produce a relatively stable aqueous dispersion in water. In cases where the two ingredients form thoroughly homogeneous mixtures, which, however, are not water-dispersible, transformation of the compounds of this invention into their salt form will sometimes render the solution water-dispersible. In such cases we have preferably employed acetic acid to effect the neutralization.

The reagents are preferably employed in the form of an aqueous dispersion, although sometimes favorable results are obtained merely by introducing the undiluted reagent into the well whose productivity is to be improved. In some of such cases, undoubtedly, there is produced in the well bore or in the formation, an aqueous dispersion of the reagent in water present in such bore or such formation. Production of an aqueous dispersion from our reagent and water is accomplished almost spontaneously on mixing the two, in most cases. We greatly prefer to employ the reagents in the form of an aqueous dispersion because in that manner the two components are prevented from separating from each other before the reagent can become effective to remove the deposit of organic materials.

The present reagents have certain advantages over other reagents which have been suggested for the same purpose. For example, the present reagents have been found to be quite stable in the presence of fairly saline water and in the presence of fairly hard water over a period ranging from at least several hours to at least several days. Reagents like those of U.S. Patent No. 1,892,205, to De Groote, dated Dec. 27, 1932, which include sulfonated saponifiable oil, react with hard water to produce insoluble precipitates of such sulfonated saponifiable oil; and such constituents of such reagents are "salted out" by saline waters. The present reagent, in contrast, are unaffected by waters of appreciable salinity and/or hardness. In fact, as stated above, we have made them into aqueous dispersions of good stability using such waters.

It is also noteworthy that our present reagents are useful in the presence of acids. They can therefore be applied satisfactorily to wells that have been acidized by the use of hydrochloric or hydrofluoric or other acids. The reagents of the above-mentioned Patent No. 1,892,205 would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the deposit of organic materials and the supporting wall.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound and 9 parts of oil solvent. We have determined that the proportion of active compound and oil solvent can advantageously vary within the range of 0:1 and 1:9.

As a preferred example of reagent we employ a 20 weight percent dispersion of active compound in an aromatic petroleum solvent and include 2% of concentrated acetic acid in the finished reagent where the salt form is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form.

From the foregoing, it will be understood that this phase of our invention includes subjecting a deposit of organic materials of the kind mentioned to the action of a reagent of the kind described. It should be understood that while our reagent includes, as an indispensible ingredient, a constituent which might constitute a wax solvent, it does not commonly operate completely to dissolve or completely to disperse any waxy organic deposit to which it may be applied in the practice of our invention. Of course, a minor portion of such deposit may be truly dissolved or dispersed by the reagent; but the usual fact is that the deposit is dislodged and brought to a trap or tank that can be more readily cleaned of the organic materials. The same statement applies to other types of organic matter which are found in such deposits. The reagent is usually applied in such small and economical amounts that it could not dissolve completely, or even satisfactorily, the organic deposit to which its action is directed. Its manner of operation is uncertain; but its effects are frequently striking. Well productivity usually increases promptly. Line pressures which have increased with deposition of the organic matter drop to normal within a short time; and sometimes sizeable chunks of the dislodged deposit are observed in open flows from wells or lines, or on screens inserted into such flows for purposes of observation.

Our reagents can be applied in a large number of different ways depending upon the character of the organic deposit it is desired to remove and on the location of such deposit. If the productivity of a well has declined to undesirably low levels, and the clogging deposit is found at the formation, it may be preferable to introduce the reagent, either in undiluted form, or as an aqueous dispersion, into the fluids being produced from the well, and then tie the tubing back into the casing of the well and circulate the fluids being produced. In this manner chemicalized well fluids are passed over the deposit for a period of from several hours to several days, usually with a striking improvement in well productivity when circulation is stopped and normal production of the well is resumed.

Sometimes the deposit is located at some higher or lower level in the tubing. For example, passage of the well fluids past a point in the well which lies opposite a water sand may produce a deposit at that point, because such a water sand commonly represents a point of cooling. In treating tubing deposits, the circulation method above may be practiced. However, in some instances, it is possible to introduce the reagent in undiluted or diluted form into the tubing at the well head by unscrewing the stuffing box. (Usually the tubing does not stand entirely full of fluid because of slight leakage past the pump.) If the reagent is introduced as an aqueous dispersion, it will settle relatively slowly down through the oil in the tubing until it reaches the deposit. After introducing the reagent in any desired manner, it may be allowed to stand in the tubing for any desired period of time before the well is replaced on production. In some instances it is preferred to pump the well intermittently for very short periods of time so as to pick up the reagent and lift it above the deposit and let it settle down past the deposit again during the next idle period.

Where the organic deposits in question occur in flow lines, the reagent may be introduced and allowed to "soak" the deposit. Thereafter, normal production may be resumed; and the dislodged deposit flushed from the line by the flow of well fluids. In other instances, gas pressure is put on the soaked line and the deposit flushed out in that manner. Sometimes introduction of a dilute aqueous dispersion of the reagent is effected intermittently and the deposit progressively removed. Or the reagent may be introduced in a continuous fashion, if desired.

In the case of pipe lines, the diameter of the pipe and the length of the line make it necessary to apply the reagent in the most economical fashion possible. In such cases we have found that very dilute aqueous dispersions are useful, e.g., of 1 weight percent concentration or sometimes even less. Soaking of the line, i.e., merely introducing the reagent dispersion into it and allowing the line to lie idle for a period of time, is practicable. Sometimes we prefer to prepare a relatively large volume of dilute aqueous dispersion in a tank at some convenient location at one end of the pipe line and interrupt the pumping of oil only long enough to switch to the solution tank and pump the volume of reagent dispersion into the line. Then the pumping of oil is resumed and the liquid cylinder of reagent dispersion is thereby moved across the face of the deposit in the line over the whole length of line. If desired, the direction of pumping may be reversed when such liquid cylinder of reagent dispersion reaches the opposite end of the line; and a second, or even a third pass, or more, may be made of reagent dispersion over the deposit in the line.

Where deposits have been allowed to accumulate over a considerable period of time, they may be of such proportions that application of a normal amount of our reagent would produce sloughing off of sufficient of the deposit to plug the conduit further downstream by forming a bridge with undislodged deposit at that point. In such instances, we prefer to proceed more cautiously, introducing successive small portions of reagent and successively dislodging portions of the deposit sufficiently small to pass freely through the limited freeway in the conduit.

Merely introducing our reagent into an area containing a deposit so the reagent contacts the deposit is sometimes sufficient to cause the removal of the latter. Sometimes agitation of the reagent at the face of the deposit greatly accelerates removal of the latter. Any suitable agitation means may be employed in such instances.

Because there are so many conditions under which such organic deposits may occur, it is difficult to give any preferred procedure for applying our reagent. The foregoing descriptions have covered instances where such deposits were to be removed from the face of the formation, the well tubing or casing, flow lines, and pipe lines. They may be taken as preferred methods of operating the process for the respective conditions outlined. All of them are exemplary only. The process may be varied as conditions may require. In all cases, the process consists broadly in the application of our reagent to the organic deposits described above.

Application of our reagent upstream in any system, as, for example, into a well, results in an attack on any such organic deposits further downstream. For example, wax or similar deposits, in traps and tanks, are freed and usually flowed out of such vessels in subsequent operation of the system. In the case of tanks we have found that waxy tank bottoms may sometimes be removed by introducing our reagent into the tank containing such deposits and allowing the whole to soak for a period of time. The deposit is thereby made more free and more readily removable. Removal of deposits of organic matter from oil production equipment, such as traps and tanks and the like, is obviously contemplated by our process.

The following examples are presented for purposes of illustration:

*Example 11–$A_3O_2$*

An oil well producing crude oil at the average rate of about 6 barrels per day is taken out of production. About 160 gallons of a 5 weight percent aqueous dispersion of a reagent consisting of 20 weight percent of compound 11–$A_3O_2$ of the following table in an aromatic petroleum solvent is forced into the well annulus until a back pressure of about 350 p.s.i. is obtained, in contrast to the natural formation pressure of about 250 p.s.i., so that the solution is forced into the formation under a differential pressure of about 100 p.s.i. The well is maintained under this back pressure for about 25–30 hours. Then the pressure is released and the well placed in production.

*Example 22–$O_5H$*

An oil well producing at the average rate of about 6 barrels a day is treated in the manner of the prior example except that compound 22–$O_5H$ of the following table is employed.

The compounds shown in the following table are effective as paraffin solvents.

COMPOUNDS USED IN PARAFFIN SOLVENTS

| | |
|---|---|
| 2–$A_1$ | 4–$K_4$ |
| 6–$A_2$ | 14–$O_1K$ |
| 12–$A_1$ | 5–$K_4X$ |
| 2–$O_6$ | 20–$O_1KX$ |
| 11–$O_5$ | 2–$A_4KA$ |
| 16–$O_5$ | 5–$U_3$ |
| 10–$A_1O_1$ | 14–$O_1HU$ |
| 11–$A_3O_2$ | 5–$C_1$ |
| 19–$O_1A$ | 1–$O_2HC$ |
| 22–$O_5H$ | |

COMPOUNDS USED IN PARAFFIN SOLVENTS

| | |
|---|---|
| 5–$A_1$ | 18–$A_3O_4$ |
| 17–$A_3$ | 29–$O_2A$ |
| 18–$A_3$ | 48–$O_4H$ |
| 20–$A_2$ | 11–$K_2$ |
| 28–$O_6$ | 15–$A_2O_4K$ |
| 29–$O_4$ | 44–$O_5AKA$ |
| 31–$O_2$ | 11–$U_2$ |
| 41–O | 10–$C_3$ |
| 42–O | 61–$O_2KAC$ |

Having thus described our invention, what we claim as new and desire to obtain by Letters Patent is:

1. A process for injecting water into an underground formation characterized by employing an aqueous solution of a linear polymer of a 1,2-alkyleneimine, said polymer having a molecular weight of at least 800, each alkylene unit therein having 2 to 20 carbon atoms.

2. A method of rendering preferentially oil wettable the oil-bearing siliceous formation surrounding an oil well bore hole characterized by treating said formation with a linear polymer of a 1,2-alkyleneimine, said polymer having a molecular weight of at least 800, each alkylene unit therein having 2 to 20 carbon atoms.

3. A process for the removal of mud sheaths from geological formations penetrated in the drilling of wells characterized by applying thereto a linear polymer of a 1,2-alkyleneimine, said polymer having a molecular weight of at least 800, each alkylene unit therein having 2 to 20 carbon atoms.

4. A method for treating an earth formation penetrated by the bore of a well characterized by forming a slurry of a particulated solid material in a pumpable emulsion comprising water, oil, and an emulsifying agent, introducing said slurry into the well so as to bring it into contact with the earth formation to be treated, and applying sufficient pressure to fracture the earth formation, said particulated soild material remaining suspended in the emulsion and said emulsion remaining unresolved until injected into the earth formation and therein breaking to release the particulated solid material from suspension in the emulsion and depositing the particulated solid in the earth formation, said emulsifying agent containing a linear polymer of a 1,2-alkyleneimine, said polymer having a molecular weight of at least 800, each alkylene unit therein having 2 to 20 carbon atoms.

5. A process for removing deposits of organic matter from oil equipment characterized by applying thereto a linear polymer of a 1,2-alkyleneimine, said polymer having a molecular weight of at least 800, each alkylene unit therein having 2 to 20 carbon atoms.

References Cited

UNITED STATES PATENTS

| 2,243,329 | 5/1941 | De Groote et al. | 252—341 |
| 2,272,489 | 2/1942 | Ulrich | 260—239 |

(Other references on following page)

| | | UNITED STATES PATENTS | |
|---|---|---|---|
| 2,470,830 | 5/1949 | Monson | 252—8.55 |
| 2,470,831 | 5/1949 | Monson | 252—8.55 |
| 2,800,962 | 6/1957 | Garst | 252—8.55 |
| 2,802,531 | 8/1957 | Cardwell et al. | 252—8.55 |
| 2,999,063 | 9/1961 | Hoeppel | 252—8.5 |

OTHER REFERENCES

Schwartz-Perry, "Surface Active Agents," published 1949 by Interscience Publishers of New York, p. 173, Tp 143–53.

LEON D. ROSDOL, *Primary Examiner.*

H. B. GUYNN, *Assistant Examiner.*